United States Patent
Ito et al.

(10) Patent No.: US 9,178,419 B2
(45) Date of Patent: Nov. 3, 2015

(54) POWER SOURCE CIRCUIT INCLUDING TRANSISTOR WITH OXIDE SEMICONDUCTOR

(75) Inventors: Yoshiaki Ito, Sagamihara (JP); Takuro Ohmaru, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 106 days.

(21) Appl. No.: 13/082,459

(22) Filed: Apr. 8, 2011

(65) Prior Publication Data

US 2011/0254523 A1    Oct. 20, 2011

(30) Foreign Application Priority Data

Apr. 16, 2010   (JP) ................... 2010-095197

(51) Int. Cl.
  *G05F 1/00*     (2006.01)
  *H02M 3/157*   (2006.01)
  *G09G 3/10*    (2006.01)

(52) U.S. Cl.
  CPC ............... *H02M 3/157* (2013.01); *G05F 1/00* (2013.01); *G09G 3/10* (2013.01)

(58) Field of Classification Search
  CPC ....................................................... G05F 1/10
  USPC ......... 323/282, 283, 284, 285, 108, 109, 110, 323/311; 438/104; 257/57, 59, 71, 80, 491, 257/206, 342
  See application file for complete search history.

(56) References Cited

U.S. PATENT DOCUMENTS

| | | | |
|---|---|---|---|
| 4,769,753 | A | 9/1988 | Knudson et al. |
| 4,914,375 | A | 4/1990 | Hatanaka |
| 5,727,193 | A | 3/1998 | Takeuchi |
| 5,731,856 | A | 3/1998 | Kim et al. |
| 5,744,864 | A | 4/1998 | Cillessen et al. |

(Continued)

FOREIGN PATENT DOCUMENTS

| | | |
|---|---|---|
| CN | 1319940 | 10/2001 |
| CN | 101356482 | 1/2009 |

(Continued)

OTHER PUBLICATIONS

Fujii Nobuo, "7.2.1 Reverse amplifier circuit,", Analog Electronic Circuit—in the integrated circuit era—, Feb. 25, 2004, p. 161, Shokodo Co., Ltd.

(Continued)

*Primary Examiner* — Matthew Nguyen
*Assistant Examiner* — Trinh Dang
(74) *Attorney, Agent, or Firm* — Eric J. Robinson; Robinson Intellectual Property Law Office, P.C.

(57) ABSTRACT

An object is to reduce degradation of circuit operation and to reduce the area of the entire circuit. A power source circuit is provided with a first terminal to which first voltage is input; a second terminal to which second voltage is input; a comparator being connected to the first terminal and the second terminal and comparing the first voltage and the second voltage; a digital circuit averaging, integrating, and digital pulse width modulating a first digital signal output from the comparator; a PWM output driver amplifying a second digital signal output from the digital circuit; and a smoothing circuit smoothing the amplified second digital signal.

22 Claims, 12 Drawing Sheets

(56) References Cited

U.S. PATENT DOCUMENTS

| | | | |
|---|---|---|---|
| 5,929,591 A | 7/1999 | Katou et al. | |
| 6,294,274 B1 | 9/2001 | Kawazoe et al. | |
| 6,549,429 B2 | 4/2003 | Konno | |
| 6,563,174 B2 | 5/2003 | Kawasaki et al. | |
| 6,724,156 B2 | 4/2004 | Fregoso | |
| 6,727,522 B1 | 4/2004 | Kawasaki et al. | |
| 6,798,180 B2* | 9/2004 | Sase et al. | 323/282 |
| 6,940,482 B2 | 9/2005 | Ishii et al. | |
| 6,969,959 B2 | 11/2005 | Black et al. | |
| 7,005,762 B2 | 2/2006 | Black | |
| 7,049,190 B2 | 5/2006 | Takeda et al. | |
| 7,061,014 B2 | 6/2006 | Hosono et al. | |
| 7,064,346 B2 | 6/2006 | Kawasaki et al. | |
| 7,105,868 B2 | 9/2006 | Nause et al. | |
| 7,119,525 B1 | 10/2006 | Yoshino | |
| 7,138,698 B2* | 11/2006 | Nakamura et al. | 257/491 |
| 7,211,825 B2 | 5/2007 | Shih et al | |
| 7,282,782 B2 | 10/2007 | Hoffman et al. | |
| 7,297,977 B2 | 11/2007 | Hoffman et al. | |
| 7,323,356 B2 | 1/2008 | Hosono et al. | |
| 7,342,764 B2 | 3/2008 | Black et al. | |
| 7,358,627 B2 | 4/2008 | Black et al. | |
| 7,385,224 B2 | 6/2008 | Ishii et al. | |
| 7,402,506 B2 | 7/2008 | Levy et al. | |
| 7,411,209 B2 | 8/2008 | Endo et al. | |
| 7,453,065 B2 | 11/2008 | Saito et al. | |
| 7,453,087 B2 | 11/2008 | Iwasaki | |
| 7,462,862 B2 | 12/2008 | Hoffman et al. | |
| 7,468,304 B2 | 12/2008 | Kaji et al. | |
| 7,480,128 B2 | 1/2009 | Black | |
| 7,501,293 B2 | 3/2009 | Ito et al. | |
| 7,656,946 B2* | 2/2010 | Morishima | 375/238 |
| 7,674,650 B2 | 3/2010 | Akimoto et al. | |
| 7,719,817 B2 | 5/2010 | Newman | |
| 7,732,819 B2 | 6/2010 | Akimoto et al. | |
| 7,859,815 B2 | 12/2010 | Black et al. | |
| 2001/0010638 A1 | 8/2001 | Konno | |
| 2001/0046027 A1 | 11/2001 | Tai et al. | |
| 2002/0056838 A1 | 5/2002 | Ogawa | |
| 2002/0060560 A1 | 5/2002 | Umemoto | |
| 2002/0132454 A1 | 9/2002 | Ohtsu et al. | |
| 2002/0185994 A1 | 12/2002 | Kanouda et al. | |
| 2003/0006710 A1 | 1/2003 | Black et al. | |
| 2003/0043090 A1 | 3/2003 | Yazawa et al. | |
| 2003/0160744 A1 | 8/2003 | Yoshida et al. | |
| 2003/0189401 A1 | 10/2003 | Kido et al. | |
| 2003/0197494 A1 | 10/2003 | Kanouda et al. | |
| 2003/0218222 A1 | 11/2003 | Wager et al. | |
| 2004/0038446 A1 | 2/2004 | Takeda et al. | |
| 2004/0080501 A1 | 4/2004 | Koyama | |
| 2004/0127038 A1 | 7/2004 | Carcia et al. | |
| 2004/0146101 A1 | 7/2004 | Pearce | |
| 2005/0012698 A1 | 1/2005 | Takahashi | |
| 2005/0017302 A1 | 1/2005 | Hoffman | |
| 2005/0110719 A1 | 5/2005 | Satoh et al. | |
| 2005/0116655 A1 | 6/2005 | Yazawa | |
| 2005/0199959 A1 | 9/2005 | Chiang et al. | |
| 2005/0264228 A1* | 12/2005 | Kim | 315/169.3 |
| 2006/0035452 A1 | 2/2006 | Carcia et al. | |
| 2006/0043377 A1 | 3/2006 | Hoffman et al. | |
| 2006/0044772 A1* | 3/2006 | Miura | 361/767 |
| 2006/0091793 A1 | 5/2006 | Baude et al. | |
| 2006/0108529 A1 | 5/2006 | Saito et al. | |
| 2006/0108636 A1 | 5/2006 | Sano et al. | |
| 2006/0110867 A1 | 5/2006 | Yabuta et al. | |
| 2006/0113536 A1 | 6/2006 | Kumomi et al. | |
| 2006/0113539 A1 | 6/2006 | Sano et al. | |
| 2006/0113549 A1 | 6/2006 | Den et al. | |
| 2006/0113565 A1 | 6/2006 | Abe et al. | |
| 2006/0119186 A1 | 6/2006 | Black | |
| 2006/0119187 A1 | 6/2006 | Newman | |
| 2006/0119292 A1 | 6/2006 | Black et al. | |
| 2006/0169973 A1 | 8/2006 | Isa et al. | |
| 2006/0170111 A1 | 8/2006 | Isa et al. | |
| 2006/0197092 A1 | 9/2006 | Hoffman et al. | |
| 2006/0208977 A1 | 9/2006 | Kimura | |
| 2006/0228974 A1 | 10/2006 | Thelss et al. | |
| 2006/0231882 A1 | 10/2006 | Kim et al. | |
| 2006/0238135 A1 | 10/2006 | Kimura | |
| 2006/0244107 A1 | 11/2006 | Sugihara et al. | |
| 2006/0284171 A1 | 12/2006 | Levy et al. | |
| 2006/0284172 A1 | 12/2006 | Ishii | |
| 2006/0292777 A1 | 12/2006 | Dunbar | |
| 2007/0024187 A1 | 2/2007 | Shin et al. | |
| 2007/0029977 A1 | 2/2007 | Asada | |
| 2007/0046191 A1 | 3/2007 | Saito | |
| 2007/0052025 A1 | 3/2007 | Yabuta | |
| 2007/0054507 A1 | 3/2007 | Kaji et al. | |
| 2007/0090365 A1 | 4/2007 | Hayashi et al. | |
| 2007/0108446 A1 | 5/2007 | Akimoto | |
| 2007/0152217 A1 | 7/2007 | Lai et al. | |
| 2007/0172591 A1 | 7/2007 | Seo et al. | |
| 2007/0182395 A1* | 8/2007 | Sakai et al. | 323/283 |
| 2007/0187678 A1 | 8/2007 | Hirao et al. | |
| 2007/0187760 A1 | 8/2007 | Furuta et al. | |
| 2007/0194379 A1 | 8/2007 | Hosono et al. | |
| 2007/0252928 A1 | 11/2007 | Ito et al. | |
| 2007/0272922 A1 | 11/2007 | Kim et al. | |
| 2007/0287296 A1 | 12/2007 | Chang | |
| 2008/0006877 A1 | 1/2008 | Mardilovich et al. | |
| 2008/0024012 A1* | 1/2008 | Qahouq et al. | 307/126 |
| 2008/0038882 A1 | 2/2008 | Takechi et al. | |
| 2008/0038929 A1 | 2/2008 | Chang | |
| 2008/0050595 A1 | 2/2008 | Nakagawara et al. | |
| 2008/0073653 A1 | 3/2008 | Iwasaki | |
| 2008/0083950 A1 | 4/2008 | Pan et al. | |
| 2008/0094010 A1 | 4/2008 | Black | |
| 2008/0106191 A1 | 5/2008 | Kawase | |
| 2008/0128689 A1 | 6/2008 | Lee et al. | |
| 2008/0129195 A1 | 6/2008 | Ishizaki et al. | |
| 2008/0166834 A1 | 7/2008 | Kim et al. | |
| 2008/0182358 A1 | 7/2008 | Cowdery-Corvan et al. | |
| 2008/0224133 A1 | 9/2008 | Park et al. | |
| 2008/0252277 A1 | 10/2008 | Sase et al. | |
| 2008/0254569 A1 | 10/2008 | Hoffman et al. | |
| 2008/0258139 A1 | 10/2008 | Ito et al. | |
| 2008/0258140 A1 | 10/2008 | Lee et al. | |
| 2008/0258141 A1 | 10/2008 | Park et al. | |
| 2008/0258143 A1 | 10/2008 | Kim et al. | |
| 2008/0296568 A1 | 12/2008 | Ryu et al. | |
| 2009/0009505 A1 | 1/2009 | Koyama | |
| 2009/0009704 A1 | 1/2009 | Tomikawa | |
| 2009/0068773 A1 | 3/2009 | Lai et al. | |
| 2009/0073325 A1 | 3/2009 | Kuwabara et al. | |
| 2009/0114910 A1 | 5/2009 | Chang | |
| 2009/0134399 A1 | 5/2009 | Sakakura et al. | |
| 2009/0152506 A1 | 6/2009 | Umeda et al. | |
| 2009/0152541 A1 | 6/2009 | Maekawa et al. | |
| 2009/0278122 A1 | 11/2009 | Hosono et al. | |
| 2009/0280600 A1 | 11/2009 | Hosono et al. | |
| 2010/0006826 A1 | 1/2010 | Dimmler | |
| 2010/0045110 A1* | 2/2010 | Liu et al. | 307/32 |
| 2010/0065844 A1 | 3/2010 | Tokunaga | |
| 2010/0066325 A1* | 3/2010 | Shionoiri | 323/282 |
| 2010/0092800 A1 | 4/2010 | Itagaki et al. | |
| 2010/0109002 A1 | 5/2010 | Itagaki et al. | |
| 2010/0123654 A1* | 5/2010 | Kimura | 345/92 |
| 2010/0140705 A1* | 6/2010 | Wu et al. | 257/347 |
| 2010/0231055 A1 | 9/2010 | Black et al. | |

FOREIGN PATENT DOCUMENTS

| | | |
|---|---|---|
| EP | 0820136 A | 1/1998 |
| EP | 1122874 A | 8/2001 |
| EP | 1737044 A | 12/2006 |
| EP | 1760866 A | 3/2007 |
| EP | 2003527 A | 12/2008 |
| EP | 2051365 A | 4/2009 |
| EP | 2058932 A | 5/2009 |
| EP | 2073363 A | 6/2009 |
| EP | 2194637 A | 6/2010 |
| EP | 2226847 A | 9/2010 |
| JP | 60-198861 A | 10/1985 |
| JP | 63-210022 A | 8/1988 |

(56) References Cited

FOREIGN PATENT DOCUMENTS

| | | | |
|---|---|---|---|
| JP | 63-210023 A | 8/1988 | |
| JP | 63-210024 A | 8/1988 | |
| JP | 63-215519 A | 9/1988 | |
| JP | 63-239117 A | 10/1988 | |
| JP | 63-265818 A | 11/1988 | |
| JP | 05-251705 A | 9/1993 | |
| JP | 06-348220 | 12/1994 | |
| JP | 08-264794 A | 10/1996 | |
| JP | 10-111028 A | 4/1998 | |
| JP | 10-127047 A | 5/1998 | |
| JP | 10-283148 A | 10/1998 | |
| JP | 11-505377 | 5/1999 | |
| JP | 2000-044236 A | 2/2000 | |
| JP | 2000-150900 A | 5/2000 | |
| JP | 2001-218461 A | 8/2001 | |
| JP | 2002-076356 A | 3/2002 | |
| JP | 2002-289859 A | 10/2002 | |
| JP | 2003-086000 A | 3/2003 | |
| JP | 2003-086808 A | 3/2003 | |
| JP | 2003-284325 A | 10/2003 | |
| JP | 2004-103957 A | 4/2004 | |
| JP | 2004-273614 A | 9/2004 | |
| JP | 2004-273732 A | 9/2004 | |
| JP | 2006-238062 A | 9/2006 | |
| JP | 2007-068254 A | 3/2007 | |
| JP | 2007-272641 A | 10/2007 | |
| JP | 2008-113542 A | 5/2008 | |
| JP | 2008-312237 A | 12/2008 | |
| JP | 2009-100609 A | 5/2009 | |
| KR | 2001-0078158 A | 8/2001 | |
| KR | 2008-0079239 A | 8/2008 | |
| TW | I303917 | 12/2008 | |
| WO | WO-03/005550 | 1/2003 | |
| WO | WO-2004/114391 | 12/2004 | |
| WO | WO-2007/114068 | 10/2007 | |

OTHER PUBLICATIONS

International Search Report (Application No. PCT/JP2011/058487) Dated Jun. 21, 2011.
Written Opinion (Application No. PCT/JP2011/058487) Dated Jun. 21, 2011.
Fortunato.E et al., "Wide-Bandgap High-Mobility ZnO Thin-Film Transistors Produced At Room Temperature,", Appl. Phys. Lett. (Applied Physics Letters) , Sep. 27, 2004, vol. 85, No. 13, pp. 2541-2543.
Dembo.H et al., "RFCPUS on Glass and Plastic Substrates Fabricated by TFT Transfer Technology,", IEDM 05: Technical Digest of International Electron Devices Meeting, Dec. 5, 2005, pp. 1067-1069.
Ikeda.T et al., "Full-Functional System Liquid Crystal Display Using CG-Silicon Technology,", SID Digest '04 : SID International Symposium Digest of Technical Papers, 2004, vol. 35, pp. 860-863.
Nomura.K et al., "Room-Temperature Fabrication of Transparent Flexible Thin-Film Transistors Using Amorphous Oxide Semiconductors,", Nature, Nov. 25, 2004, vol. 432, pp. 488-492.
Park.J et al., "Improvements in the Device Characteristics of Amorphous Indium Gallium Zinc Oxide Thin-Film Transistors by Ar Plasma Treatment,", Appl. Phys. Lett. (Applied Physics Letters) , Jun. 26, 2007, vol. 90, No. 26, pp. 262106-1-262106-3.
Takahashi.M et al., "Theoretical Analysis of IGZO Transparent Amorphous Oxide Semiconductor,", IDW '08 : Proceedings of the 15th International Display Workshops, Dec. 3, 2008, pp. 1637-1640.
Hayashi.R et al., "42.1: Invited Paper: Improved Amorphous In—Ga—Zn—O TFTs,", SID Digest '08 : SID International Symposium Digest of Technical Papers, May 20, 2008, vol. 39, pp. 621-624.
Prins.M et al., "A Ferroelectric Transparent Thin-Film Transistor,", Appl. Phys. Lett. (Applied Physics Letters) , Jun. 17, 1996, vol. 68, No. 25, pp. 3650-3652.
Nakamura.M et al., "The phase relations in the In2O3—Ga2ZnO4—ZnO system at 1350°C.,", Journal of Solid State Chemistry, Aug. 1, 1991, vol. 93, No. 2, pp. 298-315.

Kimizuka.N. et al., "Syntheses and Single-Crystal Data of Homologous Compounds, In2O3(ZnO)m (m=3, 4, and 5), InGaO3(ZnO)3, and Ga2O3(ZnO)m (m=7, 8, 9, and 16) in the In2O3—ZnGa2O4—ZnO System,", Journal of Solid State Chemistry, Apr. 1, 1995, vol. 116, No. 1, pp. 170-178.
Nomura.K et al., "Thin-Film Transistor Fabricated in Single-Crystalline Transparent Oxide Semiconductor,", Science, May 23, 2003, vol. 300, No. 5623, pp. 1269-1272.
Masuda.S et al., "Transparent thin film transistors using ZnO as an active channel layer and their electrical properties,", J. Appl. Phys. (Journal of Applied Physics) , Feb. 1, 2003, vol. 93, No. 3, pp. 1624-1630.
Asakuma.N. et al., "Crystallization and Reduction of Sol-Gel-Derived Zinc Oxide Films by Irradiation With Ultraviolet Lamp,", Journal of Sol-Gel Science and Technology, 2003, vol. 26, pp. 181-184.
Osada.T et al., "15.2: Development of Driver-Integrated Panel using Amorphous In—Ga—Zn—Oxide TFT,", SID Digest '09 : SID International Symposium Digest of Technical Papers, May 31, 2009, pp. 184-187.
Nomura.K et al., "Carrier transport in transparent oxide semiconductor with intrinsic structural randomness probed using single-crystalline InGaO3(ZnO)5 films,", Appl. Phys. Lett. (Applied Physics Letters) , Sep. 13, 2004, vol. 85, No. 11, pp. 1993-1995.
Li.C et al., "Modulated Structures of Homologous Compounds InMO3(ZnO)m (M=In,Ga; m=Integer) Described by Four-Dimensional Superspace Group,", Journal of Solid State Chemistry, 1998, vol. 139, pp. 347-355.
Son.K et al., "42.4L: Late-News Paper: 4 Inch QVGA AMOLED Driven by the Threshold Voltage Controlled Amorphous GIZO (Ga2O3—In2O3—ZnO) TFT,", SID Digest '08 : SID International Symposium Digest of Technical Papers, May 20, 2008, vol. 39, pp. 633-636.
Lee.J et al., "World'S Largest (15-Inch) XGA AMLCD Panel Using IGZO Oxide TFT,", SID Digest '08 : SID International Symposium Digest of Technical Papers, May 20, 2008, vol. 39, pp. 625-628.
Nowatari.H et al., "60.2: Intermediate Connector With Suppressed Voltage Loss for White Tandem OLEDS,", SID Digest '09 : SID International Symposium Digest of Technical Papers, May 31, 2009, vol. 40, pp. 899-902.
Kanno.H et al., "White Stacked Electrophosphorecent Organic Light-Emitting Devices Employing MOO3 As a Charge-Generation Layer,", Adv. Mater. (Advanced Materials), 2006, vol. 18, No. 3, pp. 339-342.
Tsuda.K et al., "Ultra Low Power Consumption Technologies for Mobile TFT-LCDs ,", IDW '02 : Proceedings of the 9th International Display Workshops, Dec. 4, 2002, pp. 295-298.
Van de Walle.C, "Hydrogen as a Cause of Doping in Zinc Oxide,", Phys. Rev. Lett. (Physical Review Letters), Jul. 31, 2000, vol. 85, No. 5, pp. 1012-1015.
Fung.T et al., "2-D Numerical Simulation of High Performance Amorphous In—Ga—Zn—O TFTs for Flat Panel Displays,", AM-FPD '08 Digest of Technical Papers, Jul. 2, 2008, pp. 251-252, The Japan Society of Applied Physics.
Jeong.J et al., "3.1: Distinguished Paper: 12.1-Inch WXGA AMOLED Display Driven by Indium—Gallium—Zinc Oxide TFTs Array,", SID Digest '08 : SID International Symposium Digest of Technical Papers, May 20, 2008, vol. 39, No. 1, pp. 1-4.
Park.J et al., "High performance amorphous oxide thin film transistors with self-aligned top-gate structure,", IEDM 09: Technical Digest of International Electron Devices Meeting, Dec. 7, 2009, pp. 191-194.
Kurokawa.Y et al., "UHF RFCPUS on Flexible and Glass Substrates for Secure RFID Systems,", Journal of Solid-State Circuits , 2008, vol. 43, No. 1, pp. 292-299.
Ohara.H et al., "Amorphous In—Ga—Zn—Oxide TFTs with Suppressed Variation for 4.0 inch QVGA AMOLED Display,", AM-FPD '09 Digest of Technical Papers, Jul. 1, 2009, pp. 227-230, The Japan Society of Applied Physics.
Coates.D et al., "Optical Studies of the Amorphous Liquid-Cholesteric Liquid Crystal Transition:The "Blue Phase",", Physics Letters, Sep. 10, 1973, vol. 45A, No. 2, pp. 115-116.

(56) References Cited

OTHER PUBLICATIONS

Cho.D et al., "21.2:Al and Sn-Doped Zinc Indium Oxide Thin Film Transistors for AMOLED Back-Plane,", SID Digest '09 : SID International Symposium Digest of Technical Papers, May 31, 2009, pp. 280-283.

Lee.M et al., "15.4:Excellent Performance of Indium—Oxide-Based Thin-Film Transistors by DC Sputtering,", SID Digest '09 : SID International Symposium Digest of Technical Papers, May 31, 2009, pp. 191-193.

Jin.D et al., "65.2:Distinguished Paper:World-Largest (6.5") Flexible Full Color Top Emission AMOLED Display on Plastic Film and Its Bending Properties,", SID Digest '09 : SID International Symposium Digest of Technical Papers, May 31, 2009, pp. 983-985.

Sakata.J et al., "Development of 4.0-In. AMOLED Display With Driver Circuit Using Amorphous In—Ga—Zn—Oxide TFTs,", IDW '09 : Proceedings of the 16th International Display Workshops, 2009, pp. 689-692.

Park.J at al., "Amorphous Indium—Gallium—Zinc Oxide TFTs and Their Application for Large Size AMOLED,", AM-FPD '08 Digest of Technical Papers, Jul. 2, 2008, pp. 275-278.

Park.S et al., "Challenge to Future Displays: Transparent AM-OLED Driven by PEALD Grown ZnO TFT,", IMID '07 Digest, 2007, pp. 1249-1252.

Godo.H et al., "Temperature Dependence of Characteristics and Electronic Structure for Amorphous In—Ga—Zn—Oxide TFT,", AM-FPD '09 Digest of Technical Papers, Jul. 1, 2009, pp. 41-44.

Osada.T et al., "Development of Driver-Integrated Panel Using Amorphous In—Ga—Zn—Oxide TFT,", AM-FPD '09 Digest of Technical Papers, Jul. 1, 2009, pp. 33-36.

Hirao.T at al., "Novel Top-Gate Zinc Oxide Thin-Film Transistors (ZnO TFTs) for AMLCDS,", Journal of the SID, 2007, vol. 15, No. 1, pp. 17-22.

Hosono.H, "68.3:Invited Paper:Transparent Amorphous Oxide Semiconductors for High Performance TFT,", SID Digest '07 : SID International Symposium Digest of Technical Papers, 2007, vol. 38, pp. 1830-1833.

Godo.H at al., "P-9:Numerical Analysis on Temperature Dependence of Characteristics of Amorphous In—Ga—Zn—Oxide TFT,", SID Digest '09 : SID International Symposium Digest of Technical Papers, May 31, 2009, pp. 1110-1112.

Ohara.H at al., "21.3:4.0 In. QVGA AMOLED Display Using In—Ga—Zn—Oxide TFTs With a Novel Passivation Layer,", SID Digest '09 : SID International Symposium Digest of Technical Papers, May 31, 2009, pp. 284-287.

Miyasaka.M, "Suftla Flexible Microelectronics on Their Way to Business,", SID Digest '07 : SID International Symposium Digest of Technical Papers, 2007, vol. 38, pp. 1673-1676.

Chern.H et al., "An Analytical Model for the Above-Threshold Characteristics of Polysilicon Thin-Film Transistors,", IEEE Transactions on Electron Devices, Jul. 1, 1995, vol. 42, No. 7, pp. 1240-1246.

Kikuchi.H et al., "39.1:Invited Paper:Optically Isotropic Nano-Structured Liquid Crystal Composites for Display Applications,", SID Digest '09 : SID International Symposium Digest of Technical Papers, May 31, 2009, pp. 578-581.

Asaoka.Y et al., "29.1: Polarizer-Free Reflective LCD Combined With Ultra Low-Power Driving Technology,", SID Digest '09 : SID International Symposium Digest of Technical Papers, May 31, 2009, pp. 395-398.

Lee.H et al., "Current Status of, Challenges to, and Perspective View of AM-OLED ,", IDW '06 : Proceedings of the 13th International Display Workshops, Dec. 7, 2006, pp. 663-666.

Kikuchi.H et al., "62.2:Invited Paper:Fast Electro-Optical Switching in Polymer-Stabilized Liquid Crystalline Blue Phases for Display Application,", SID Digest '07 : SID International Symposium Digest of Technical Papers, 2007, vol. 38, pp. 1737-1740.

Nakamura.M, "Synthesis of Homologous Compound with New Long-Period Structure,", Nirim Newsletter, Mar. 1, 1995, vol. 150, pp. 1-4.

Kikuchi.H et al., "Polymer-Stabilized Liquid Crystal Blue Phases,", Nature Materials, Sep. 1, 2002, vol. 1, pp. 64-68.

Kimizuka.N. et al., "SPINEL,YBFE2O4, and YB2FE3O7 Types of Structures for Compounds in the IN2O3 and SC2O3—A2O3—BO Systems [A; Fe, Ga, or Al; B: Mg, Mn, Fe, Ni, Cu,or Zn] at Temperatures Over 1000°C.,", Journal of Solid State Chemistry, 1985, vol. 60, pp. 382-384.

Kitzerow.H et al., "Observation of Blue Phases in Chiral Networks,", Liquid Crystals, 1993, vol. 14, No. 3, pp. 911-916.

Costello.M et al., "Electron Microscopy of a Cholesteric Liquid Crystal and Its Blue Phase,", Phys. Rev. A (Physical Review. A), May 1, 1984, vol. 29, No. 5, pp. 2957-2959.

Meiboom.S et al., "Theory of the Blue Phase of Cholesteric Liquid Crystals,", Phys. Rev. Lett. (Physical Review Letters), May 4, 1981, vol. 46, No. 18, pp. 1216-1219.

Park.Sang-Hee et al., "42.3: Transparent ZnO Thin Film Transistor for the Application of High Aperture Ratio Bottom Emission AM-OLED Display,", SID Digest '08 : SID International Symposium Digest of Technical Papers, May 20, 2008, vol. 39, pp. 629-632.

Orita.M et al., "Mechanism of Electrical Conductivity of Transparent InGaZnO4,", Phys. Rev. B (Physical Review. B), Jan. 15, 2000, vol. 61, No. 3, pp. 1811-1816.

Nomura.K et al., "Amorphous Oxide Semiconductors for High-Performance Flexible Thin-Film Transistors,", Jpn. J. Appl. Phys. (Japanese Journal of Applied Physics) , 2006, vol. 45, No. 5B, pp. 4303-4308.

Janotti.A et al., "Native Point Defects in ZnO,", Phys. Rev. B (Physical Review. B), Oct. 4, 2007, vol. 76, No. 16, pp. 165202-1-165202-22.

Park.J et al., "Electronic Transport Properties of Amorphous Indium—Gallium—Zinc Oxide Semiconductor Upon Exposure to Water,", Appl. Phys. Lett. (Applied Physics Letters) , 2008, vol. 92, pp. 072104-1-072104-3.

Hsieh.H et al., "P-29:Modeling of Amorphous Oxide Semiconductor Thin Film Transistors and Subgap Density of States,", SID Digest '08 : SID International Symposium Digest of Technical Papers, 2008, vol. 39, pp. 1277-1280.

Janotti.A et al., "Oxygen Vacancies in ZnO,", Appl. Phys. Lett. (Applied Physics Letters) , 2005, vol. 87, pp. 122102-1-122102-3.

Oba.F et al., "Defect energetics in ZnO: A hybrid Hartree-Fock density functional study,", Phys. Rev. B (Physical Review. B), 2008, vol. 77, pp. 245202-1-245202-6.

Orita.M et al., "Amorphous transparent conductive oxide InGaO3(ZnO)m (m<4):a Zn4s conductor,", Philosophical Magazine, 2001, vol. 81, No. 5, pp. 501-515.

Hosono.H et al.,"Working hypothesis to explore novel wide band gap electrically conducting amorphous oxides and examples,", J. Non-Cryst. Solids (Journal of Non-Crystalline-Solids), 1996, vol. 198-200, pp. 165-169.

Mo.Y et al., "Amorphous Oxide TFT Backplanes for Large Size AMOLED Displays,", IDW '08 : Proceedings of the 6th International Display Workshops, Dec. 3, 2008, pp. 581-584.

Kim.S et al., "High-Performance oxide thin film transistors passivated by various gas plasmas,", 214th ECS Meeting, 2008, No. 2317.

Clark.S et al., "First Principles Methods Using CASTEP,", Zeitschrift fur Kristallographie, 2005, vol. 220, pp. 567-570.

Lany.S et al., "Dopability, Intrinsic Conductivity, and Nonstoichiometry of Transparent Conducting Oxides,", Phys. Rev. Lett. (Physical Review Letters), Jan. 26, 2007, vol. 98, pp. 045501-1-045501-4.

Park.J et at "Dry etching of ZnO films and plasma-induced damage to optical properties,", J. Vac. Sci. Technol. B (Journal of Vacuum Science & Technology B), Mar. 1, 2003, vol. 21, No. 2, pp. 800-803.

Oh.M et al., "Improving the Gate Stability of ZnO Thin-Film Transistors With Aluminum Oxide Dielectric Layers,", J. Electrochem. Soc. (Journal of the Electrochemical Society), 2008, vol. 155, No. 12, pp. H1009-H1014.

Ueno.K et al., "Field-Effect Transistor on SrTiO3 With Sputtered Al2O3 Gate Insulator,", Appl. Phys. Lett. (Applied Physics Letters) , Sep. 1, 2003, vol. 83, No. 9, pp. 1755-1757.

Taiwanese Office Action (Application No. 100112556) Dated Jul. 23, 2015.

* cited by examiner

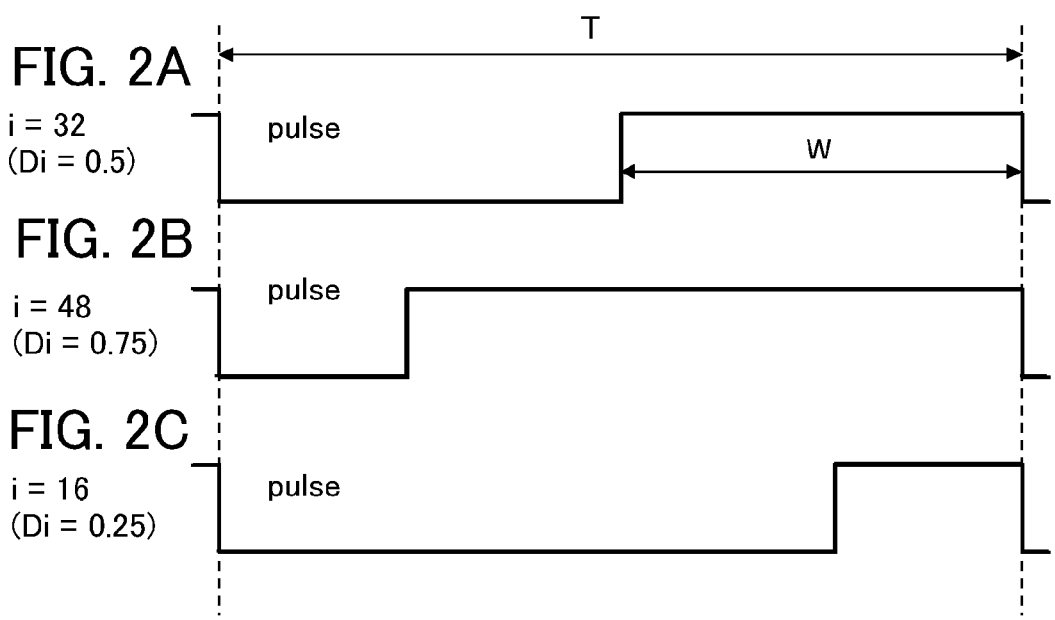

POWER SOURCE CIRCUIT INCLUDING TRANSISTOR WITH OXIDE SEMICONDUCTOR

TECHNICAL FIELD

One embodiment of the disclosed invention relates to a digital circuit which can be applied to a power source circuit (a switching regulator).

BACKGROUND ART

In a power source circuit (a switching regulator), an error amplifier circuit (or an error amplifier) is an important circuit to determine the operation of a feedback circuit in the power source circuit.

The error amplifier circuit is an analog circuit which processes analog signals. The error amplifier circuit in general has a structure in which passive elements having a large area, such as a capacitor and a resistor, are connected (see Patent Document 1 and Non-Patent Document 1).

REFERENCE

[Patent Document 1] Japanese Published Patent Application No. 2006-238062

Non-Patent Document

FUJII Nobuo, "Analog Electronic Circuit —in the integrated circuit era-", Shokodo, 2004, p. 161

DISCLOSURE OF INVENTION

If characteristics of elements such as transistors in an analog circuit vary, an output signal may be disordered, which may result in degradation of the circuit operation of the analog circuit. This may pose a problem of degradation of the power source circuit including the analog circuit.

In addition, the area of a passive element in an analog circuit is large, which may cause an increase in the area of the entire power source circuit including the analog circuit. This increases the cost of the power source circuit.

In view of the foregoing, an object of one embodiment of the disclosed invention is to suppress degradation of circuit operation of a power source circuit.

Another object of one embodiment of the disclosed invention is to reduce the area of the power source circuit.

Another object of one embodiment of the disclosed invention is to reduce cost of the power source circuit by reducing the area of the power source circuit.

In one embodiment of the disclosed invention, an error amplifier circuit which is an analog circuit is replaced with a digital control circuit. Specifically, voltage difference comparison, integration, and voltage output which are conventionally performed by the error amplifier circuit are performed by a comparator, a digital arithmetic process circuit, a pulse width modulation (PWM) driver, and a low pass filter (LPF) instead. Thus, all the circuits except for the comparator and the low pass filter can be digital circuits.

In the digital control circuit which is used instead, voltage difference comparison is performed by a comparator, integration and phase setting for pulse width modulation are performed by a digital arithmetic process circuit, and power output and frequency response are performed by a pulse width modulation output driver and a low pass filter.

One embodiment of the disclosed invention relates to a power source circuit including a comparator comparing first voltage and second voltage; a digital arithmetic process circuit averaging, integrating, and digital pulse width modulating a digital signal output from the comparator; a pulse width modulation output driver amplifying the digital signal output from the digital arithmetic process circuit; and a smoothing circuit smoothing the amplified digital signal.

In one embodiment of the disclosed invention, the comparator, the digital arithmetic process circuit, and the pulse width modulation output driver each include a transistor including an oxide semiconductor film including a channel formation region, a source electrode, a drain electrode, a gate electrode, and a gate insulating film.

One embodiment of the disclosed invention relates to a power source circuit including a comparator comparing the first voltage and the second voltage, an adder circuit averaging the digital signal output from the comparator; an adder-subtractor circuit integrating the averaged digital signal; a count comparison circuit and a latch circuit digital pulse width modulating the integrated digital signal; a pulse width modulation output driver amplifying the digital signal output from the latch circuit; and a smoothing circuit smoothing the amplified digital signal.

In one embodiment of the disclosed invention, the power source circuit includes a DC-DC converter.

In one embodiment of the disclosed invention, the DC-DC converter includes a coil, a diode, and a transistor including an oxide semiconductor film including a channel formation region.

In one embodiment of the disclosed invention, the comparator, the adder circuit, the adder-subtractor circuit, the count comparison circuit, the latch circuit, and the pulse width modulation output driver each include a transistor including an oxide semiconductor film including a channel formation region, a source electrode, a drain electrode, a gate electrode, and a gate insulating film.

In one embodiment of the disclosed invention, the transistor is a top-gate transistor and a top surface of the oxide semiconductor film is in contact with the source electrode and the drain electrode.

In one embodiment of the disclosed invention, the transistor is a top-gate transistor and a bottom surface of the oxide semiconductor film is in contact with the source electrode and the drain electrode.

In one embodiment of the disclosed invention, the transistor is a bottom-gate transistor and a top surface of the oxide semiconductor film is in contact with the source electrode and the drain electrode.

In one embodiment of the disclosed invention, the transistor is a bottom-gate transistor and a bottom surface of the oxide semiconductor film is in contact with the source electrode and the drain electrode.

In one embodiment of the disclosed invention, the smoothing circuit is a low pass filter.

By using a digital control circuit in the power source circuit, degradation of circuit operation of the power source circuit can be reduced even when characteristics of transistors vary.

By using a digital control circuit in the power source circuit, the area of the power source circuit can be reduced.

By reducing the area of the power source circuit, the cost of the power source circuit can be reduced.

BRIEF DESCRIPTION OF DRAWINGS

FIGS. 2A to 2C illustrate a method of a digital pulse width modulation process.

BEST MODE FOR CARRYING OUT THE INVENTION

Figure 1:
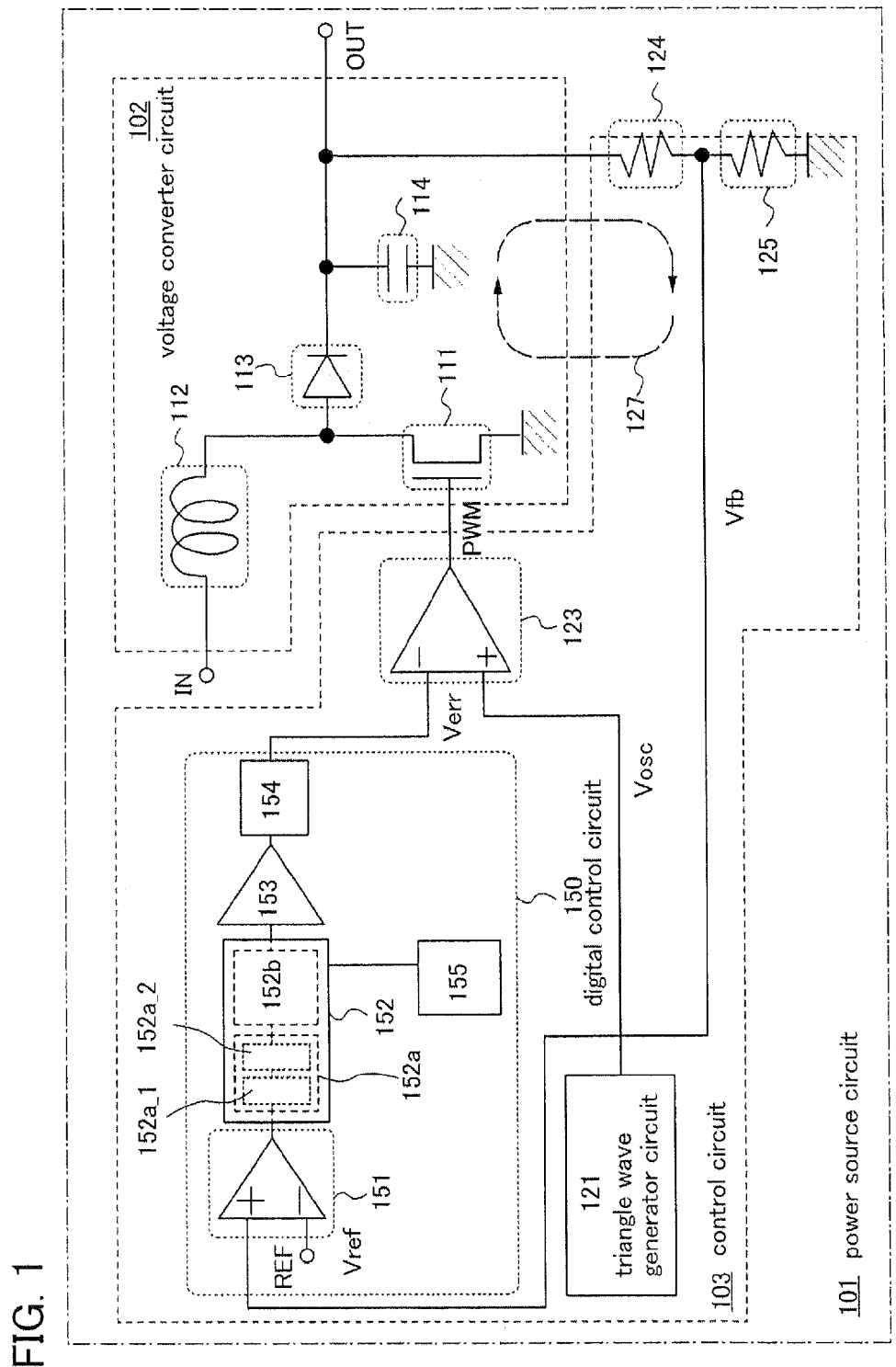
FIG. 1 illustrates a circuit structure of a power source circuit.

Embodiments of the invention disclosed in this specification will be hereinafter described with reference to the drawings. Note that the invention disclosed in this specification can be carried out in a variety of different modes and it will be readily appreciated by those skilled in the art that modes and details can be modified in various ways without departing from the spirit and the scope of the invention disclosed in this specification. Accordingly, the present invention should not be construed as being limited to the description of the embodiments. Note that in the drawings shown below, like portions or portions having a similar function are denoted by like reference numerals, and the description thereof is omitted.

[Embodiment 1]

FIG. 1 illustrates an example of a power source circuit 101. The power source circuit 101 includes a voltage converter circuit 102 and a control circuit 103 for controlling the voltage converter circuit 102. The voltage converter circuit 102 is a DC-DC converter including a transistor 111, a coil 112, a diode 113, and a capacitor 114. The control circuit 103 includes a triangle wave generator circuit 121, a digital control circuit 150, a pulse width modulation output driver 123, a resistor 124, and a resistor 125. In addition, a dotted arrow 127 indicates a loop of a feedback circuit. A feedback voltage Vfb, which is an output voltage of the resistor 124, is input to the digital control circuit 150.

A DC-DC converter is a circuit which converts a direct current voltage to another direct current voltage. Typical conversion modes of a DC-DC converter include a linear mode and a switching mode. A switching mode DC-DC converter has excellent conversion efficiency. In this embodiment, a switching mode DC-DC converter, particularly a chopper-type DC-DC converter including a transistor, a coil, a diode, and a capacitor is used as the voltage converter circuit 102.

The digital control circuit 150 includes a comparator 151, a digital arithmetic process circuit 152, a pulse width modulation output driver 153, and a low pass filter (LPF) 154.

When an error amplifier circuit is replaced with the digital control circuit 150, variation in characteristics of elements in the circuit 150 does not pose a problem. In the digital control circuit 150, the digital arithmetic process circuit 152 and the pulse width modulation output driver 153 are digital circuits.

The digital circuit determines whether the signal is 1 or 0 (zero) according to whether the level of a signal in the circuit is higher or lower than a reference, and therefore performs data processing properly even when the elements in the digital circuit vary in characteristics.

In addition, in the digital control circuit 150, the use of passive elements having a large area (e.g., a capacitor and a resistor) is reduced; therefore, the digital control circuit 150 is preferable in that the area of the circuit can be reduced.

The comparator 151 compares a reference voltage Vref which is input from an inverted input terminal REF and a feedback voltage Vfb, and outputs a digital signal of H (high level) or L (low level), that is, a digital signal 1 or 0 (zero).

The digital arithmetic process circuit 152 includes a digital average-integrator 152a and a digital pulse width modulator 152b. The digital average-integrator 152a includes a digital averaging circuit 152a_1 and a digital integrator 152a_2. To the digital arithmetic process circuit 152, an external clock divider 155 is connected, and a clock signal is input from the clock divider 155.

The digital arithmetic process circuit 152 performs an averaging process, an integration process, and a digital pulse width modulation process of the digital signal output from the comparator 151. In the digital average-integrator 152a, the digital averaging circuit 152a_1 performs an averaging process and the digital integrator 152a_2 performs an integration process. The digital pulse width modulator 152b performs a digital pulse width modulation process.

The digital arithmetic process circuit 152 holds N bits of data on the digital signal (which is either H (high level) or L (low level)) output from the comparator 151, compares the frequency of appearance of H signal and L signal, and outputs either one with a higher frequency. Thus, the digital signal is averaged.

Figure 6:
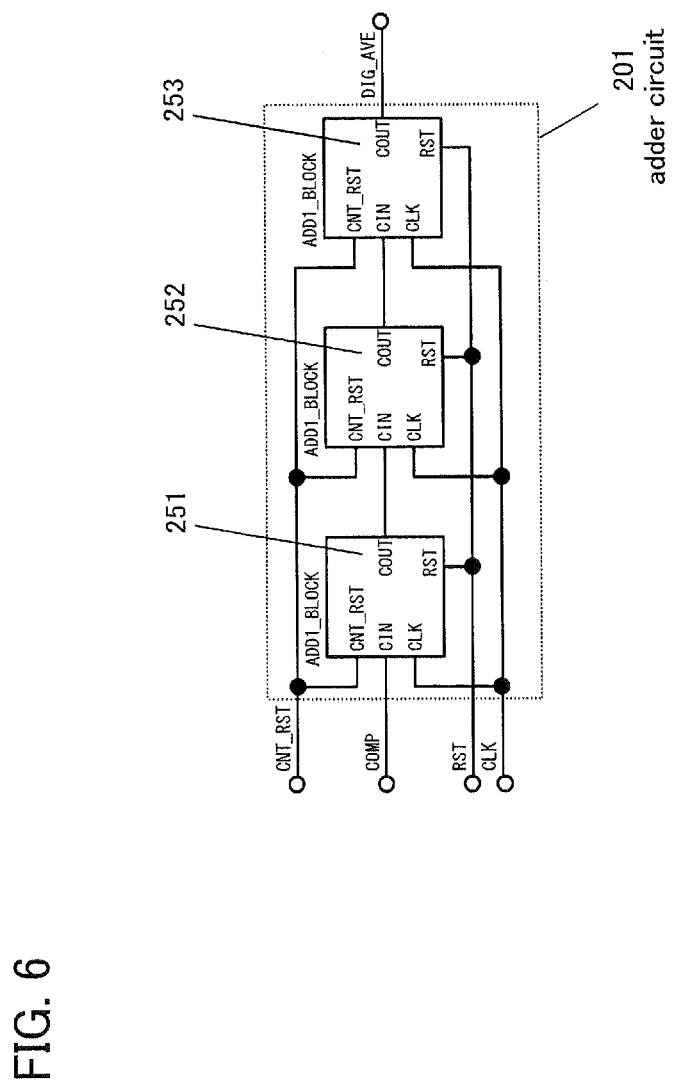
FIG. 6 is a circuit diagram illustrating an adder circuit.
Figure 7:
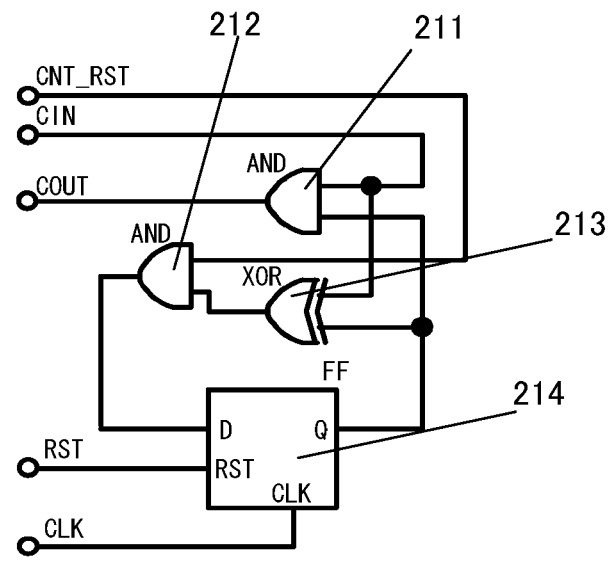
FIG. 7 is a circuit diagram illustrating an adder.

FIGS. 6 and 7 illustrate specific circuit structures of the digital averaging circuit 152a_1 which is in the digital average-integrator 152a in FIG. 1 and which performs an averaging process. An adder circuit 201 in FIG. 6 is an example of the digital averaging circuit 152a_1.

The adder circuit 201 detects the value of a signal COMP from the comparator 151 every count and holds H (high level) if the value of the signal COMP is H (high level). For example, the adder circuit 201 outputs an averaged digital signal DIG_AVE every 7 counts. In this embodiment, if the signal COMP of H (high level) is input 4 or more times, the digital signal DIG_AVE of H (high level) is output and if the signal COMP of H (high level) is input 3 or less times, the digital signal DIG_AVE of L (low level) is output. In addition, the stored signal COMP is reset every 8 counts by a reset signal RST.

The adder circuit 201 includes an adder 251, an adder 252, and an adder 253.

To a first terminal of the adder 251, a first terminal of the adder 252 and a first terminal of the adder 253 are connected, and a control reset signal CNT_RST is input. The control reset signal CNT_RST is a signal which resets data in the adder circuit 201. To a second terminal of the adder 251, the signal COMP is input from the comparator 151. To a third terminal of the adder 251, a third terminal of the adder 252 and a third terminal of the adder 253 are connected, and a clock signal CLK is input. To a fourth terminal of the adder 251, a fourth terminal of the adder 252 and a fourth terminal of the adder 253 are connected, and the reset signal RST is input. The reset signal RST is a signal which resets data in the flip flop 214 described below. To a fifth terminal of the adder 251, a second terminal of the adder 252 is connected. The fifth terminal of the adder 251 outputs an output signal COUT.

To the first terminal of the adder 252, the first terminal of the adder 251 and the first terminal of the adder 253 are connected, and the control reset signal CNT_RST is input. To the second terminal of the adder 252, the fifth terminal of the adder 251 is connected. The output signal COUT output from the fifth terminal of the adder 251 is input to the second terminal of the adder 252 as an input signal CIN. To the third terminal of the adder 252, the third terminal of the adder 251 and the third terminal of the adder 253 are connected, and the clock signal CLK is input. To the fourth terminal of the adder 252, the fourth terminal of the adder 251 and the fourth terminal of the adder 253 are connected, and the reset signal RST is input. To the fifth terminal of the adder 252, a second terminal of the adder 253 is connected. The fifth terminal of the adder 252 outputs the output signal COUT.

To the first terminal of the adder 253, the first terminal of the adder 251 and the first terminal of the adder 252 are connected, and the control reset signal CNT_RST is input. To the second terminal of the adder 253, the fifth terminal of the adder 252 is connected. The output signal COUT output from the fifth terminal of the adder 252 is input to the second terminal of the adder 253 as the input signal CIN. To the third terminal of the adder 253, the third terminal of the adder 251 and the third terminal of the adder 252 are connected, and the clock signal CLK is input. To the fourth terminal of the adder 253, the fourth terminal of the adder 251 and the fourth terminal of the adder 252 are connected, and the reset signal RST is input. The fifth terminal of the adder 253 outputs the averaged digital signal DIG_AVE.

FIG. 7 illustrates a circuit diagram of each of the adders 251 to 253. Each of the adders 251 to 253 includes an AND gate 211, an AND gate 212, an XOR gate 213, and a flip flop (FF) 214.

To a first input terminal of the AND gate 211, a first input terminal of the XOR gate 213 is connected and the input signal CIN is input. To a second input terminal of the AND gate 211, a second input terminal of the XOR gate 213 and a fourth terminal of the flip flop 214 are connected. An output terminal of the AND gate 211 outputs an output signal COUT.

To a first input terminal of the AND gate 212, the control reset signal CNT_RST is input. To a second input terminal of the AND gate 212, an output terminal of the XOR gate 213 is connected. To an output terminal of the AND gate 212, a first terminal of the flip flop 214 is connected.

To the first input terminal of the XOR gate 213, the first input terminal of the AND gate 211 is connected and the input signal CIN is input. To the second input terminal of the XOR gate 213, the second input terminal of the AND gate 211 and the fourth terminal of the flip flop 214 are connected. To the output terminal of the XOR gate 213, the second input terminal of the AND gate 212 is connected.

To the first terminal of the flip flop 214, the output terminal of the AND gate 212 is connected. To a second terminal of the flip flop 214, the reset signal RST is input. To a third terminal of the flip flop 214, the clock signal CLK is input. To the fourth terminal of the flip flop 214, the second input terminal of the AND gate 211 and the second input terminal of the XOR gate 213 are connected.

Then, the digital integrator 152a_2 adds "−1" or "+1" depending on the averaged digital signal DIG_AVE and performs integration. Note that when the averaged digital signal DIG_AVE is an H (high level) signal, "−1" is added, while when the averaged digital signal DIG_AVE is an L (low level) signal, "+1" is added. Thus, the averaged digital signal DIG_AVE is integrated.

Figure 8:
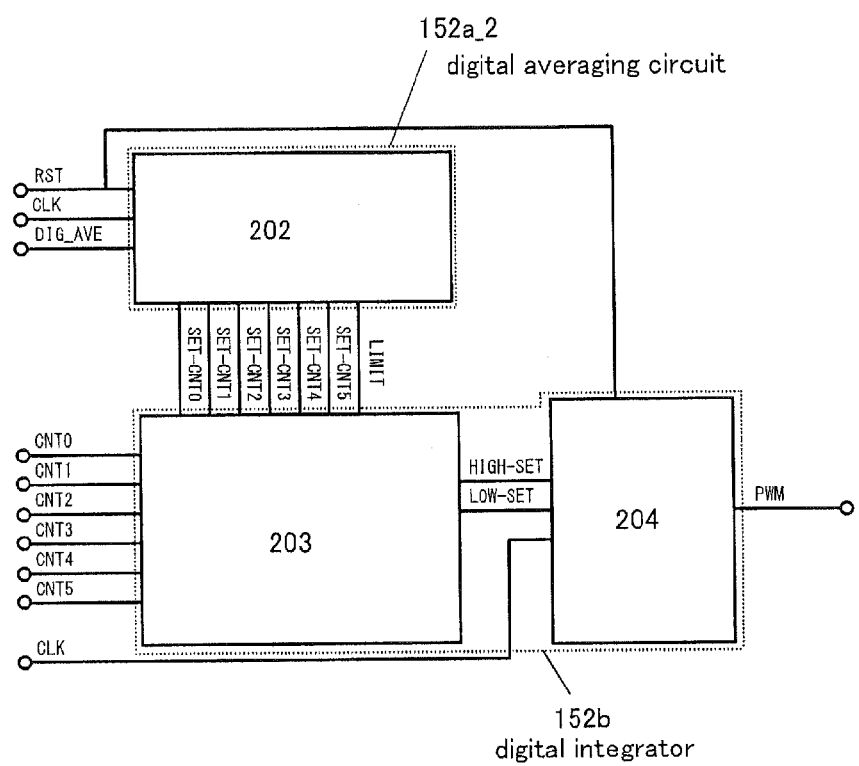
FIG. 8 is a circuit diagram illustrating an adder-subtractor circuit, a count comparison circuit, and a latch circuit.

FIG. 8 illustrates a circuit structure of the digital integrator 152a_2 (an adder-subtractor circuit 202) which is a specific circuit in the digital average-integrator 152a in FIG. 1 and performs integration. FIG. 8 also illustrates a circuit structure (a count comparison circuit 203 and a latch circuit 204) of the digital pulse width modulator 152b in FIG. 1.

To a first terminal of the adder-subtractor circuit 202, a first terminal of the latch circuit 204 is connected and the reset signal RST is input. To a second terminal of the adder-subtractor circuit 202, the clock signal CLK is input. To a third terminal of the adder-subtractor circuit 202, the averaged digital signal DIG_AVE is input. To a fourth terminal of the adder-subtractor circuit 202, a first terminal of the count comparison circuit 203 is connected. The fourth terminal of the adder-subtractor circuit 202 outputs a signal SET-CNT0. To a fifth terminal of the adder-subtractor circuit 202, a second terminal of the count comparison circuit 203 is connected. The fifth terminal of the adder-subtractor circuit 202 outputs a signal SET-CNT1. To a sixth terminal of the adder-subtractor circuit 202, a third terminal of the count comparison circuit 203 is connected. The sixth terminal of the adder-subtractor circuit 202 outputs a signal SET-CNT2. To a seventh terminal of the adder-subtractor circuit 202, a fourth terminal of the count comparison circuit 203 is connected. The seventh terminal of the adder-subtractor circuit 202 outputs a signal SET-CNT3. To an eighth terminal of the adder-subtractor circuit 202, a fifth terminal of the count comparison circuit 203 is connected. The eighth terminal of the adder-subtractor circuit 202 outputs a signal SET-CNT4. To a ninth terminal of the adder-subtractor circuit 202, a sixth terminal of the count comparison circuit 203 is connected. The ninth terminal of the adder-subtractor circuit 202 outputs a signal SET-CNT5. To a tenth terminal of the adder-subtractor circuit 202, a seventh terminal of the count comparison circuit 203 is connected. The tenth terminal of the adder-subtractor circuit 202 outputs a limit signal LIMIT.

To the signals SET-CNT0 to SET-CNT5, "−1" or "+1" is added every time the clock signal CLK is input: when the input averaged digital signal DIG_AVE is an H (high level) signal, "−1" is added, while when the input averaged digital signal DIG_AVE is an L (low level) signal, "+1" is added. The signals SET-CNT0 to SET-CNT5 are then output.

The signals SET-CNT0 to SET-CNT5 are needed for generating a pulse signal PULSE having a pulse width W described below. In this embodiment, with the signals SET-CNT0 to SET-CNT5, $2^6$-phase i.e., 64-phase signal PULSE can be generated.

The limit signal LIMIT is a signal which limits a phase in a process of generating the pulse signal PULSE having a pulse width W described below. In this embodiment, by the limit signal LIMIT, for example, the signals SET-CNT0 to SET-CNT5 are limited to 8 to 56. Thus, the proximity of the maximum value of the pulse width W of the pulse signal PULSE to the period of the pulse signal PULSE and the proximity of the minimum value of the pulse width W to 0 (zero) is prevented.

To the first terminal of the count comparison circuit 203, the fourth terminal of the adder-subtractor circuit 202 is connected and the signal SET-CNT0 is input. To the second terminal of the count comparison circuit 203, the fifth terminal of the adder-subtractor circuit 202 is connected and the signal SET-CNT1 is input. To the third terminal of the count comparison circuit 203, the sixth terminal of the adder-subtractor circuit 202 is connected and the signal SET-CNT2 is input. To the fourth terminal of the count comparison circuit 203, the seventh terminal of the adder-subtractor circuit 202 is connected and the signal SET-CNT3 is input. To the fifth terminal of the count comparison circuit 203, the eighth terminal of the adder-subtractor circuit 202 is connected and the signal SET-CNT4 is input. To the sixth terminal of the count comparison circuit 203, the ninth terminal of the adder-subtractor circuit 202 is connected and the signal SET-CNT5 is input. To the seventh terminal of the count comparison circuit 203, the tenth terminal of the adder-subtractor circuit 202 is connected. The seventh terminal of the count comparison circuit 203 outputs the limit signal LIMIT. To an eighth terminal of the count comparison circuit 203, a signal CNT0 is input. To a ninth terminal of the count comparison circuit 203, a signal CNT1 is input. To a tenth terminal of the count comparison circuit 203, a signal CNT2 is input. To an eleventh terminal of the count comparison circuit 203, a signal CNT3 is input. To a twelfth terminal of the count comparison circuit 203, a signal CNT4 is input. To a thirteenth terminal of the count comparison circuit 203, a signal CNT5 is input. A fourteenth terminal of the count comparison circuit 203 outputs a signal HIGH-SET. A fifteenth terminal of the count comparison circuit 203 outputs a signal LOW-SET.

The signals CNT0 to CNT5 are count signals. In this embodiment, input of the signals CNT0 to CNT5 can count from 0 to 63.

The signal HIGH-SET and the signal LOW-SET determine whether the pulse width modulation output signal PWM is an H (high level) signal or an L (low level) signal. When the signal HIGH-SET is input, the pulse width modulation output signal PWM becomes an H (high level) signal. When the signal LOW-SET is input, the pulse width modulation output signal PWM becomes an L (low level) signal.

To the first terminal of the latch circuit 204, the first terminal of the adder-subtractor circuit 202 is connected and the reset signal RST is input. To a second terminal of the latch circuit 204, the fourteenth terminal of the count comparison circuit 203 is connected and the signal HIGH-SET is input. To a third terminal of the latch circuit 204, the fifteenth terminal of the count comparison circuit 203 is connected and the signal LOW-SET is input. From a fourth terminal of the latch circuit 204, the pulse width modulation output signal PWM is output. To a fifth terminal of the latch circuit 204, the clock signal CLK is input.

Figure 9:
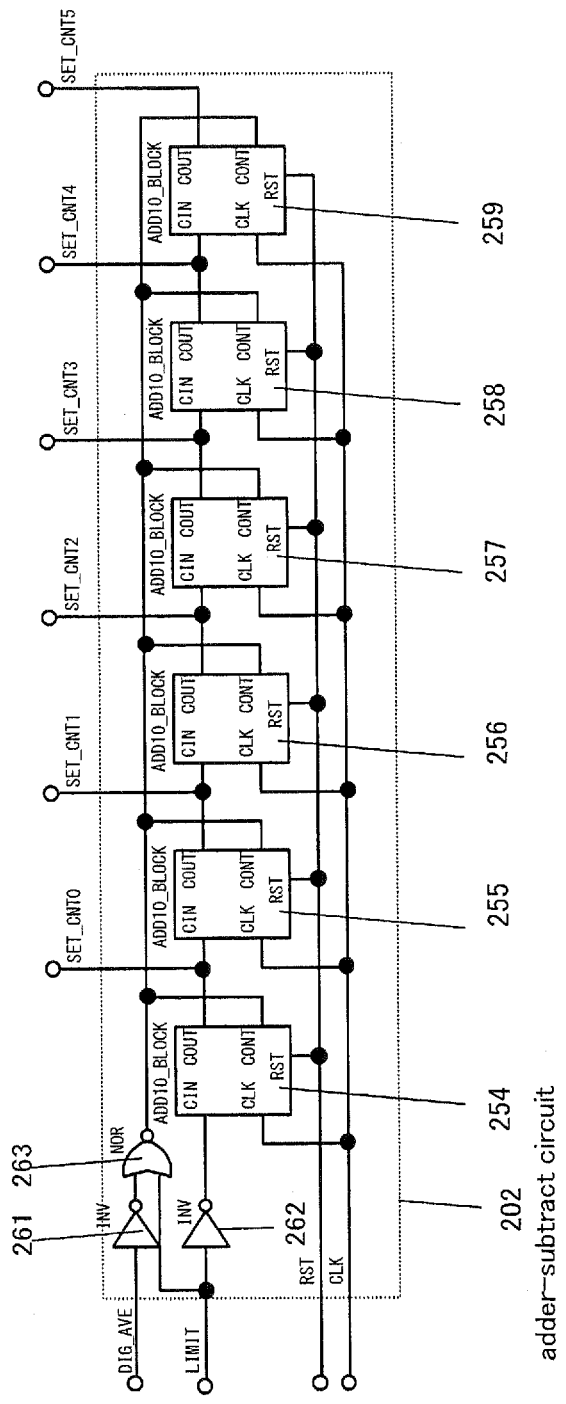
FIG. 9 is a circuit diagram illustrating an adder-subtractor circuit.

FIG. 9 illustrates a specific circuit structure of the adder-subtractor circuit 202.

The adder-subtractor circuit 202 in FIG. 9 includes an inverter 261, an inverter 262, a NOR gate 263, an adder 254, an adder 255, an adder 256, an adder 257, an adder 258, and an adder 259.

To an input terminal of the inverter 261, the averaged digital signal DIG_AVE is input. An output terminal of the inverter 261 is connected to a first input terminal of the NOR gate 263.

To an input terminal of the inverter 262, a second input terminal of the NOR gate 263 is connected and the limit signal LIMIT is input. To an output terminal of the inverter 262, a first terminal of the adder 254 is connected.

To the first input terminal of the NOR gate 263, the output terminal of the inverter 261 is connected. To the second input terminal of the NOR gate 263, the input terminal of the inverter 262 is connected and the limit signal LIMIT is input.

To the first terminal of the adder 254, the output terminal of the inverter 262 is connected. To a second terminal of the adder 254, a second terminal of the adder 255, a second terminal of the adder 256, a second terminal of the adder 257, a second terminal of the adder 258, and a second terminal of the adder 259 are connected, and the clock signal CLK is input. To a third terminal of the adder 254, a third terminal of the adder 255, a third terminal of the adder 256, a third terminal of the adder 257, a third terminal of the adder 258, and a third terminal of the adder 259 are connected, and the reset signal RST is input. To a fourth terminal of the adder 254, an output terminal of the NOR gate 263, a fourth terminal of the adder 255, a fourth terminal of the adder 256, a fourth terminal of the adder 257, a fourth terminal of the adder 258, and a fourth terminal of the adder 259 are connected. To a fifth terminal of the adder 254, a first terminal of the adder 255 is connected and the fifth terminal of the adder 254 outputs the signal SET_CNT0.

To the first terminal of the adder 255, the fifth terminal of the adder 254 is connected and the signal SET_CNT0 is input. To the second terminal of the adder 255, the second terminal of the adder 254, the second terminal of the adder 256, the second terminal of the adder 257, the second terminal of the adder 258, and the second terminal of the adder 259 are connected, and the clock signal CLK is input. To the third terminal of the adder 255, the third terminal of the adder 254, the third terminal of the adder 256, the third terminal of the adder 257, the third terminal of the adder 258, and the third terminal of the adder 259 are connected, and the reset signal RST is input. To the fourth terminal of the adder 255, the output terminal of the NOR gate 263, the fourth terminal of the adder 254, the fourth terminal of the adder 256, the fourth terminal of the adder 257, the fourth terminal of the adder 258, and the fourth terminal of the adder 259 are connected. To a fifth terminal of the adder 255, a first terminal of the adder 256 is connected and the fifth terminal of the adder 255 outputs a signal SET_CNT1.

To the first terminal of the adder 256, the fifth terminal of the adder 255 is connected and the signal SET_CNT1 is input. To the second terminal of the adder 256, the second terminal of the adder 254, the second terminal of the adder 255, the second terminal of the adder 257, the second terminal of the adder 258, and the second terminal of the adder 259 are connected, and the clock signal CLK is input. To the third terminal of the adder 256, the third terminal of the adder 254, the third terminal of the adder 255, the third terminal of the adder 257, the third terminal of the adder 258, and the third terminal of the adder 259 are connected, and the reset signal RST is input. To the fourth terminal of the adder 256, the output terminal of the NOR gate 263, the fourth terminal of the adder 254, the fourth terminal of the adder 255, the fourth terminal of the adder 257, the fourth terminal of the adder 258, and the fourth terminal of the adder 259 are connected. To a fifth terminal of the adder 256, a first terminal of the adder 257 is connected and the fifth terminal of the adder 256 outputs a signal SET_CNT2.

To the first terminal of the adder 257, the fifth terminal of the adder 256 is connected and the signal SET_CNT2 is input. To the second terminal of the adder 257, the second terminal of the adder 254, the second terminal of the adder 255, the second terminal of the adder 256, the second terminal of the adder 258, and the second terminal of the adder 259 are connected, and the clock signal CLK is input. To the third terminal of the adder 257, the third terminal of the adder 254, the third terminal of the adder 255, the third terminal of the adder 256, the third terminal of the adder 258, and the third terminal of the adder 259 are connected, and the reset signal RST is input. To the fourth terminal of the adder 257, the output terminal of the NOR gate 263, the fourth terminal of the adder 254, the fourth terminal of the adder 255, the fourth terminal of the adder 256, the fourth terminal of the adder 258, and the fourth terminal of the adder 259 are connected. To a fifth terminal of the adder 257, a first terminal of the adder 258 is connected and the fifth terminal of the adder 257 outputs a signal SET_CNT3.

To the first terminal of the adder 258, the fifth terminal of the adder 257 is connected and the signal SET_CNT3 is input.

To the second terminal of the adder 258, the second terminal of the adder 254, the second terminal of the adder 255, the second terminal of the adder 256, the second terminal of the adder 257, and the second terminal of the adder 259 are connected, and the clock signal CLK is input. To the third terminal of the adder 258, the third terminal of the adder 254, the third terminal of the adder 255, the third terminal of the adder 256, the third terminal of the adder 257, and the third terminal of the adder 259 are connected, and the reset signal RST is input. To the fourth terminal of the adder 258, the output terminal of the NOR gate 263, the fourth terminal of the adder 254, the fourth terminal of the adder 255, the fourth terminal of the adder 256, the fourth terminal of the adder 257, and the fourth terminal of the adder 259 are connected. To a fifth terminal of the adder 258, a first terminal of the adder 259 is connected and the fifth terminal of the adder 258 outputs a signal SET_CNT4.

To the first terminal of the adder 259, the fifth terminal of the adder 258 is connected and the signal SET_CNT4 is input. To the second terminal of the adder 259, the second terminal of the adder 254, the second terminal of the adder 255, the second terminal of the adder 256, the second terminal of the adder 257, and the second terminal of the adder 258 are connected, and the clock signal CLK is input. To the third terminal of the adder 259, the third terminal of the adder 254, the third terminal of the adder 255, the third terminal of the adder 256, the third terminal of the adder 257, and the third terminal of the adder 258 are connected, and the reset signal RST is input. To the fourth terminal of the adder 259, the output terminal of the NOR gate 263, the fourth terminal of the adder 254, the fourth terminal of the adder 255, the fourth terminal of the adder 256, the fourth terminal of the adder 257, and the fourth terminal of the adder 258 are connected. A fifth terminal of the adder 259 outputs a signal SET_CNT5.

Figure 10:
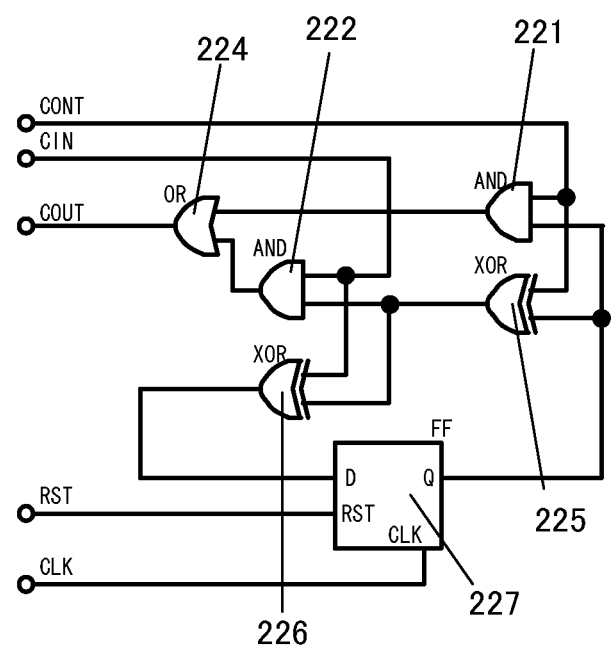
FIG. 10 is a circuit diagram illustrating an adder.

FIG. 10 illustrates a circuit diagram of each of the adders 254 to 259. Each of the adders 254 to 259 includes an AND gate 221, an AND gate 222, an OR gate 224, an XOR gate 225, an XOR gate 226, and a flip flop 227.

To a first input terminal of the AND gate 221, a first input terminal of the XOR gate 225 is connected and a control signal CONT is input. The control signal CONT is a signal which indicates the adder at the subsequent stage that either addition or subtraction is to be performed. To a second input terminal of the AND gate 221, a second input terminal of the XOR gate 225 and a fourth terminal of the flip flop 227 are connected. To an output terminal of the AND gate 221, a first input terminal of the OR gate 224 is connected.

To a first input terminal of the AND gate 222, a first input terminal of the XOR gate 226 is connected and the input signal CIN is input. To a second input terminal of the AND gate 222, an output terminal of the XOR gate 225 and a second input terminal of the XOR gate 226 are connected. To an output terminal of the AND gate 222, a second input terminal of the OR gate 224 is connected.

To the first input terminal of the OR gate 224, the output terminal of the AND gate 221 is connected. To the second input terminal of the OR gate 224, the output terminal of the AND gate 222 is connected. An output terminal of the OR gate 224 outputs an output signal COUT.

To the first input terminal of the XOR gate 225, the first input terminal of the AND gate 221 is connected and the control signal CONT is input. To the second input terminal of the XOR gate 225, the second input terminal of the AND gate 221 and the fourth terminal of the flip flop 227 are connected. To the output terminal of the XOR gate 225, the second input terminal of the AND gate 222 and the second input terminal of the XOR gate 226 are connected.

To the first input terminal of the XOR gate 226, the first input terminal of the AND gate 222 is connected and the input signal CIN is input. To the second input terminal of the XOR gate 226, the second input terminal of the AND gate 222 and the output terminal of the XOR gate 225 are connected. To an output terminal of the XOR gate 226, a first terminal the flip flop 227 is connected.

To the first terminal of the flip flop 227, the output terminal of the XOR gate 226 is connected. To a second terminal of the flip flop 227, the reset signal RST is input. To a third terminal of the flip flop 227, the clock signal CLK is input. To the fourth terminal of the flip flop 227, the second input terminal of the AND gate 221 and the second input terminal of the XOR gate 225 is connected.

The digital pulse width modulator 152b sets the pulse width of the pulse width modulation in accordance with an integrated digital signal. Thus, a digital pulse width modulation process is performed. The pulse width modulation output signal PWM which has been subjected to digital pulse width modulation is input to the pulse width modulation output driver 153.

Figure 11:
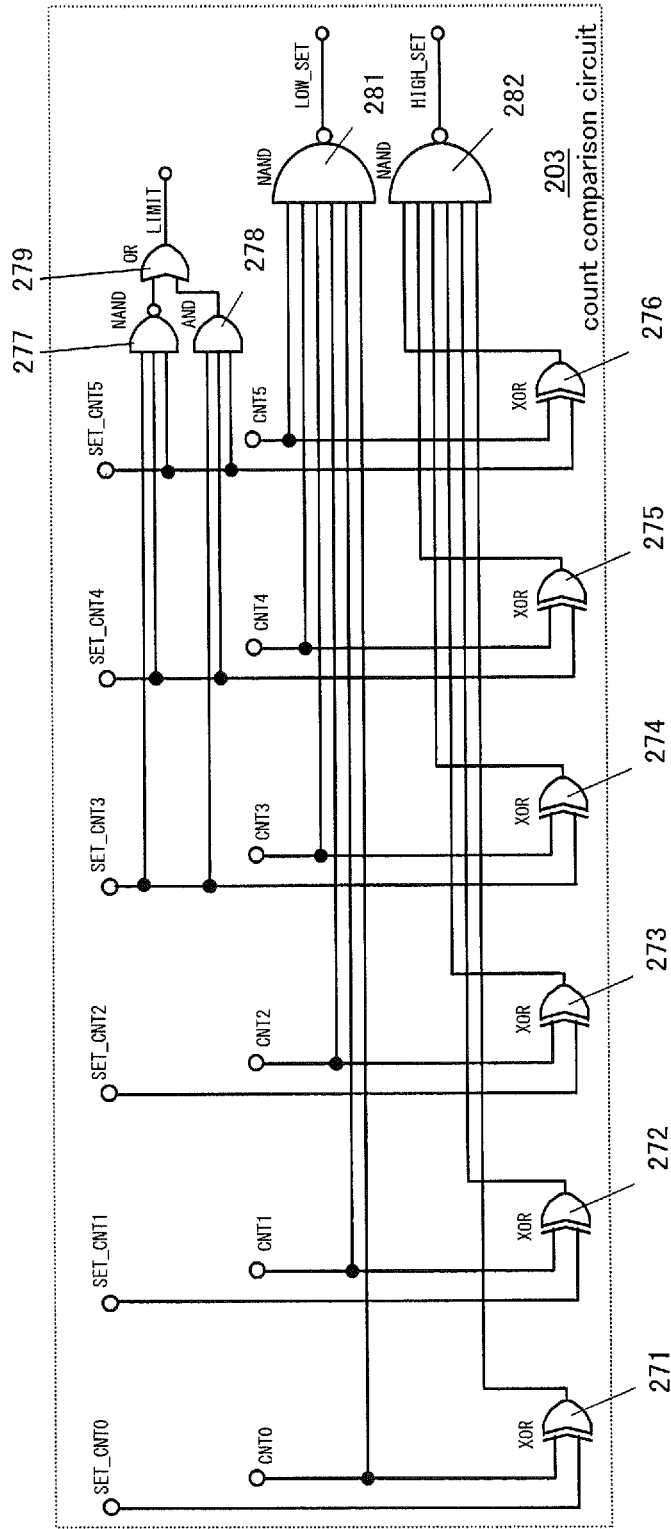
FIG. 11 is a circuit diagram illustrating a count comparison circuit.
Figure 12:
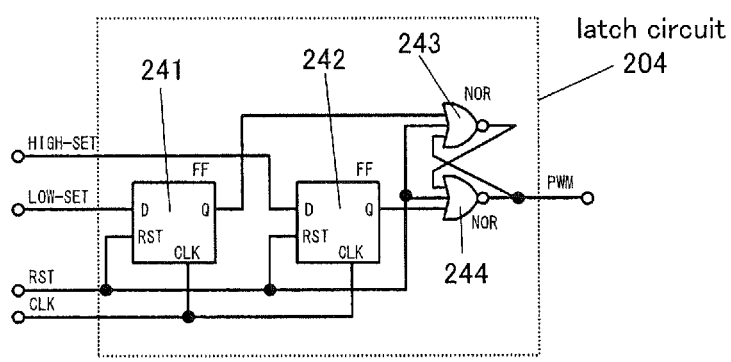
FIG. 12 is a circuit diagram illustrating a latch circuit.

FIG. 11 and FIG. 12 illustrate specific circuit structures of the digital pulse width modulator 152b. The count comparison circuit 203 in FIG. 11 and the latch circuit 204 in FIG. 12 are specific examples of the digital pulse width modulator 152b. The count comparison circuit 203 compares the predetermined value of the duty ratio determined by the signals SET-CNT0 to SET-CNT5 and the value of the signals CNT0 to CNT5, and generates the pulse width modulation output signal PWM when they much.

FIG. 11 illustrates a circuit diagram of the count comparison circuit 203.

The count comparison circuit 203 includes an XOR gate 271, an XOR gate 272, an XOR gate 273, an XOR gate 274, an XOR gate 275, an XOR gate 276, a NAND gate 277, an AND gate 278, an OR gate 279, a NAND gate 281, and a NAND gate 282.

To a first input terminal of the XOR gate 271, a first input terminal of the NAND gate 281 is connected, and the signal CNT0 is input. To a second input terminal of the XOR gate 271, the signal SET_CNT0 is input. To an output terminal of the XOR gate 271, a first input terminal of the NAND gate 282 is connected.

To a first input terminal of the XOR gate 272, a second input terminal of the NAND gate 281 is connected, and the signal CNT1 is input. To a second input terminal of the XOR gate 272, the signal SET_CNT1 is input. To an output terminal of the XOR gate 272, a second input terminal of the NAND gate 282 is connected.

To a first input terminal of the XOR gate 273, a third input terminal of the NAND gate 281 is connected, and the signal CNT2 is input. To a second input terminal of the XOR gate 273, the signal SET_CNT2 is input. To an output terminal of the XOR gate 273, a third input terminal of the NAND gate 282 is connected.

To a first input terminal of the XOR gate 274, a fourth input terminal of the NAND gate 281 is connected, and the signal CNT3 is input. To a second input terminal of the XOR gate 274, a first input terminal of the NAND gate 277 and a first input terminal of the AND gate 278 are connected, and the signal SET_CNT3 is input. To an output terminal of the XOR gate 274, a fourth input terminal of the NAND gate 282 is connected.

To a first input terminal of the XOR gate 275, a fifth input terminal of the NAND gate 281 is connected, and the signal CNT4 is input. To a second input terminal of the XOR gate 275, a second input terminal of the NAND gate 277 and a second input terminal of the AND gate 278 are connected, and the signal SET_CNT4 is input. To an output terminal of the XOR gate 275, a fifth input terminal of the NAND gate 282 is connected.

To a first input terminal of the XOR gate 276, a sixth input terminal of the NAND gate 281 is connected, and the signal CNT5 is input. To a second input terminal of the XOR gate 276, a third input terminal of the NAND gate 277 and a third input terminal of the AND gate 278 are connected, and the signal SET_CNT5 is input. To an output terminal of the XOR gate 276, a sixth input terminal of the NAND gate 282 is connected.

To the first input terminal of the NAND gate 277, the second input terminal of the XOR gate 274 and the first input terminal of the AND gate 278 are connected, and the signal SET_CNT3 is input. To the second input terminal of the NAND gate 277, the second input terminal of the XOR gate 275 and the second input terminal of the AND gate 278 are connected, and the signal SET_CNT4 is input. To the third input terminal of the NAND gate 277, the second input terminal of the XOR gate 276 and the third input terminal of the AND gate 278 are connected, and the signal SET_CNT5 is input. To an output terminal of the NAND gate 277, a first input terminal of the OR gate 279 is connected.

To the first input terminal of the AND gate 278, the second input terminal of the XOR gate 274 and the first input terminal of the NAND gate 277 are connected, and the signal SET_CNT3 is input. To the second input terminal of the AND gate 278, the second input terminal of the XOR gate 275 and the second input terminal of the NAND gate 277 are connected, and the signal SET_CNT4 is input. To the third input terminal of the AND gate 278, the second input terminal of the XOR gate 276 and the third input terminal of the NAND gate 277 are connected, and the signal SET_CNT5 is input. To an output terminal of the AND gate 278, a second input terminal of the OR gate 279 is connected.

To the first input terminal of the OR gate 279, the output terminal of the NAND gate 277 is connected. To the second input terminal of the OR gate 279, the output terminal of the AND gate 278 is connected. An output terminal of the OR gate 279 outputs the limit signal LIMIT.

To the first input terminal of the NAND gate 281, the first input terminal of the XOR gate 271 is connected, and the signal CNT0 is input. To the second input terminal of the NAND gate 281, the first input terminal of the XOR gate 272 is connected, and the signal CNT1 is input. To the third input terminal of the NAND gate 281, the first input terminal of the XOR gate 273 is connected, and the signal CNT2 is input. To the fourth input terminal of the NAND gate 281, the first input terminal of the XOR gate 274 is connected, and the signal CNT3 is input. To the fifth input terminal of the NAND gate 281, the first input terminal of the XOR gate 275 is connected, and the signal CNT4 is input. To the sixth input terminal of the NAND gate 281, the first input terminal of the XOR gate 276 is connected, and the signal CNT5 is input. An output terminal of the NAND gate 281 outputs the signal LOW-SET.

To the first input terminal of the NAND gate 282, the output terminal of the XOR gate 271 is connected. To the second input terminal of the NAND gate 282, the output terminal of the XOR gate 272 is connected. To the third input terminal of the NAND gate 282, the output terminal of the XOR gate 273 is connected. To the fourth input terminal of the NAND gate 282, the output terminal of the XOR gate 274 is connected. To the fifth input terminal of the NAND gate 282, the output terminal of the XOR gate 275 is connected. To the sixth input terminal of the NAND gate 282, the output terminal of the XOR gate 276 is connected. An output terminal of the NAND gate 282 outputs the signal HIGH-SET.

FIG. 12 is a circuit diagram of the latch circuit 204. The latch circuit 204 includes a flip flop 241, a flip flop 242, a NOR gate 243, and a NOR gate 244.

To a first terminal of the flip flop 241, the signal LOW-SET is input. To a second terminal of the flip flop 241, a second terminal of the flip flop 242, a second input terminal of the NOR gate 243, and a second input terminal of the NOR gate 244 are connected, and the reset signal RST is input. To a third terminal of the flip flop 241, a third terminal of the flip flop 242 is connected, and the clock signal CLK is input. To a fourth terminal of the flip flop 241, a first input terminal of the NOR gate 243 is connected.

To a first terminal of the flip flop 242, the signal HIGH-SET is input. To the second terminal of the flip flop 242, the second terminal of the flip flop 241, the second input terminal of the NOR gate 243, and the second input terminal of the NOR gate 244 are connected, and the reset signal RST is input. To the third terminal of the flip flop 242, the third terminal of the flip flop 241 is connected, and the clock signal CLK is input. To a fourth terminal of the flip flop 242, a first input terminal of the NOR gate 244 is connected.

To the first input terminal of the NOR gate 243, the fourth terminal of the flip flop 241 is connected. To the second input terminal of the NOR gate 243, the second terminal of the flip flop 241, the second terminal of the flip flop 242, and the second input terminal of the NOR gate 244 are connected, and the reset signal RST is input. To a third input terminal of the NOR gate 243, an output terminal of the NOR gate 244 is connected. To an output terminal of the NOR gate 243, a third input terminal of the NOR gate 244 is connected.

To the first input terminal of the NOR gate 244, the fourth terminal of the flip flop 242 is connected. To the second input terminal of the NOR gate 244, the second terminal of the flip flop 241, the second terminal of the flip flop 242, and the second input terminal of the NOR gate 243 are connected, and the reset signal RST is input. To the third input terminal of the NOR gate 244, the output terminal of the NOR gate 243 is connected. To the output terminal of the NOR gate 244, the third input terminal of the NOR gate 243 is connected. The output terminal of the NOR gate 244 outputs the pulse width modulation output signal PWM.

A digital pulse width modulation will now be described with reference to FIGS. 2A to 2C.

A pulse width of the digital pulse signal PULSE is referred to as W and a pulse period thereof is referred to as T (see FIG. 2A). The pulse signal PULSE is generated based on a clock from the clock divider 155 and the phase which is controlled by the signals SET_CNT0 to SET_CNT5. The pulse signal PULSE corresponds to the pulse width modulation output signal PWM. The duty ratio Di is given by the following FORMULA 1.

[FORMULA 1]

$$Di = (W/T) = (i/2^n) \quad (i=1, 2, \ldots, m) \qquad \text{(FORMULA 1)}$$

FIG. 2A shows the pulse signals PULSE of the case where n=6 and i=32 in FORMULA 1, FIG. 2B shows the pulse signals PULSE of the case where n=6 and i=48 in FORMULA 1, and FIG. 2C shows the pulse signals PULSE of the case where n=6 and i=16 in FORMULA 1.

When i is 32, the duty ratio D32 is 0.5; when i is 48, the duty ratio D48 is 0.75; and when i is 16, the duty ratio D16 is 0.25. A power source voltage Vdd described below is generated according to the duty ratio. A digital signal is thus converted into an analog signal, whereby a process similar to a process by a DA converter is performed.

By way of example, a method of outputting a 15.525-kHz pulse width modulation output signal which is pulse width modulated using a 1-MHz clock will be described.

When a 15.525-kHz (64-µs) pulse width modulation output signal is generated using a 1 MHz (1 µs) clock, 64-phase pulse width modulation output signal can be output.

The pulse width modulation output signal which undergoes digital pulse width modulation is input to the pulse width modulation output driver 153. The pulse width modulation output signal is increased in intensity by the pulse width modulation output driver 153. In other words, the pulse width modulation output signal is amplified by the pulse width modulation output driver 153.

The pulse width modulation output signal with increased signal intensity is input to the low pass filter 154 which is a smoothing circuit.

The low pass filter 154 blocks a high-frequency component of the pulse width modulation output signal and the pulse width modulation output signal is smoothed. Using the pulse width modulation output signal input to the low pass filter 154, voltage corresponding to the duty ratio is output. The output voltage Verr is expressed as follows: Output voltage Verr=(duty ratio)×(power source voltage of the pulse width modulation output driver 153).

In other words, a digital signal becomes an analog signal; thus, a process similar to a process by a DA converter is performed. In addition, frequency response is performed by the low pass filter 154.

In this embodiment, by using the digital control circuit 150, degradation of circuit operation of the power source circuit 101 can be reduced.

In addition, by using the digital control circuit 150 in the power source circuit 101, the area of the power source circuit can be reduced.

Another element in the control circuit 103 will be described below.

The triangle wave generator circuit 121 generates a triangle wave Vosc which is needed for a pulse width modulation signal.

To an inverted input terminal of the pulse width modulation output driver 123, the output voltage Verr of the digital control circuit 150 is input, while to a non-inverted input terminal, the triangle wave Vosc generated by the triangle wave generator circuit 121 is input.

The pulse width modulation output driver 123 compares the output voltage Verr of the digital control circuit 150 with a signal level of the triangle wave Vosc. When the signal level of the triangle wave Vosc is higher than the signal level of the output voltage Ven of the digital control circuit 150, the pulse width modulation output driver 123 outputs H (high level) as the pulse width modulation signal to the transistor 111. When the signal level of the triangle wave Vosc is lower than the signal level of the output voltage Verr of the digital control circuit 150, the pulse width modulation output driver 123 outputs L (low level) as the pulse width modulation signal to the transistor 111.

By reducing analog circuits, even when characteristics of the elements in the circuit are varied, degradation of circuit operation can be reduced.

In addition, suppression of degradation of circuit operation can reduce causes of malfunction of electrical elements including the power source circuit and electrical appliances including the electrical element.

By reducing analog circuits, provision of analog circuits with a large area can be reduced.

By reducing provision of analog circuits with a large area, the area of an integrated circuit and the area of an electrical appliance including the integrated circuit can be reduced. Accordingly, the cost of the integrated circuit and the cost of the electrical appliance including the integrated circuit can be reduced.

In addition, since the digital circuit outputs only either 1 or 0 (zero), all the transistors in the digital circuit can be of the same conductivity type, e.g., n-type. A complicated analog signal processing is very difficult for an analog circuit transistors of which have the same conductivity type. Thus, a digital circuit can be formed using transistors which have the same conductivity type in this embodiment.

[Embodiment 2]

In this embodiment, the transistor 111 and a transistor in each of the comparator 151, the digital arithmetic process circuit 152, and the pulse width modulation output driver 153 in Embodiment 1 will be described.

This embodiment will be described with reference FIGS. 3A and 3B and FIGS. 4A to 4E.

Figure 3A:
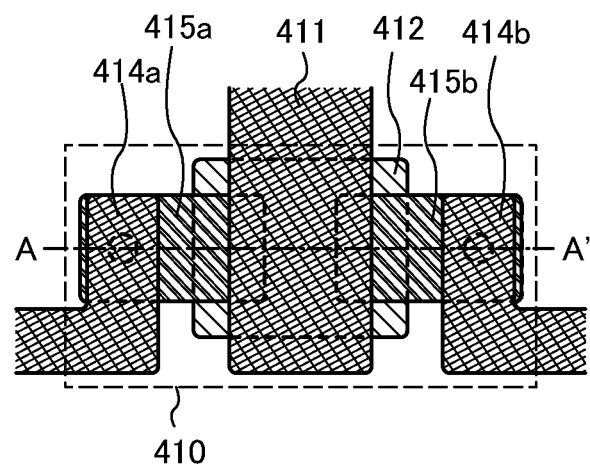
FIGS. 3A and 3B are a top view and a cross-sectional view of a transistor in which a channel formation region is provided in an oxide semiconductor film.
Figure 3B:
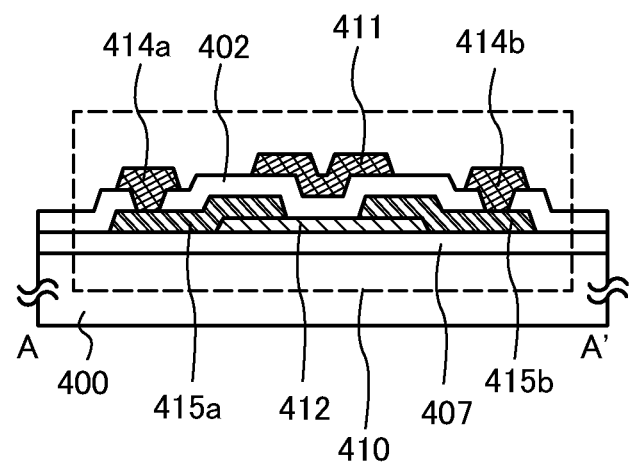

FIGS. 3A and 3B show an example of a top-surface structure and cross-sectional structure of a transistor. FIG. 3A is a top view of a top-gate transistor 410, while FIG. 3B is a cross-sectional view taken along line A-A' in FIG. 3A.

The transistor 410 includes an oxide semiconductor film 412, a first electrode (one of a source electrode and a drain electrode) 415*a*, a second electrode (the other of the source electrode and the drain electrode) 415*b*, a gate insulating film 402, and a gate electrode 411. A first wiring 414*a* and a second wiring 414*b* are in contact with and electrically connected to the first electrode 415*a* and the second electrode 415*b*, respectively. In the transistor 410, the first electrode 415*a* and the second electrode 415*b*, which are the source electrode and the drain electrode, are in contact with a top surface of the oxide semiconductor film 412 including a channel formation region; therefore, the transistor 410 can be referred to as a top-contact transistor.

Note that although the transistor 410 in FIG. 3A is a single-gate transistor, one embodiment of the disclosed invention is not limited to this structure. The transistor may be a multi-gate transistor including gate electrodes and channel formation regions.

Note that while the transistor in FIGS. 3A and 3B includes the first electrode (the one of the source electrode and the drain electrode) 415*a* and the second electrode (the other of the source electrode and the drain electrode) 415*b* formed over the oxide semiconductor film 412 including the channel formation region, one embodiment of the disclosed invention is not limited thereto. The oxide semiconductor film 412 including the channel formation region may be formed over the first electrode (the one of the source electrode and the drain electrode) 415*a* and the second electrode (the other of the source electrode and the drain electrode) 415*b*.

Further, while the transistor in FIGS. 3A and 3B is a top-gate transistor, one embodiment of the disclosed invention is not limited to this structure. The transistor 410 may be a bottom-gate transistor. Further, when the transistor 410 is a bottom-gate transistor, either the source electrode and the drain electrode or the oxide semiconductor film including the channel formation region may lie over the other. In other words, the source electrode and the drain electrode may be formed over the oxide semiconductor film including a channel formation region; alternatively, the oxide semiconductor film including a channel formation region may be formed over the source electrode and the drain electrode.

When a high-purity oxide semiconductor film is used as the oxide semiconductor film 412 of the transistor 410, characteristics of the transistor 410 are improved. Characteristics of such a high-purity oxide semiconductor film and characteristics of a transistor including the high-purity oxide semiconductor film will be described below in detail.

In the high-purity oxide semiconductor film, impurities that adversely affect the electrical characteristics of the transistor including the oxide semiconductor film are reduced to a very low level. A typical example of impurities which adversely affect the electric characteristics is hydrogen. Hydrogen is an impurity which may be a supplier (a donor) of carriers in an oxide semiconductor film. When the oxide semiconductor includes a large amount of hydrogen, the oxide semiconductor film might have n-type conductivity. Thus, a transistor including an oxide semiconductor which includes a large amount of hydrogen may be a normally-on transistor, and the on/off ratio of the transistor cannot be sufficiently high. In this specification, a "high-purity oxide semiconductor" is an intrinsic or substantially intrinsic oxide semiconductor from which hydrogen is reduced as much as possible. As an example of a high-purity oxide semiconductor, there is an oxide semiconductor in which carrier concentration is lower than $1\times10^{14}/cm^3$, preferably lower than $1\times10^{12}/cm^3$, more preferably lower than $1\times10^{11}/cm^3$ or lower than $6.0\times10^{10}/cm^3$. A transistor including a high-purity oxide semiconductor which is obtained by drastic removal of hydrogen in an oxide semiconductor film for a channel formation region has much lower off-state current than a transistor including silicon for a channel formation region, for example. Further, in this embodiment, a transistor including a high-purity oxide semiconductor is an n-channel transistor in the following description.

Note that in this specification, off-current (also referred to as leakage current) refers to current flowing between a source and a drain of an n-channel transistor having a positive threshold voltage $V_{th}$, when a given gate voltage in the range of equal to or greater than –20 V and equal to or less than –5 V is applied at room temperature. Note that the room temperature is equal to or higher than 15° C. and equal to or lower than 25° C. The current value per micrometer of channel width (w) of a transistor using an oxide semiconductor disclosed in this specification is 100 zA or less, and preferably 10 zA or less at room temperature.

Note that the resistance at the time when the transistor is off (off-state resistance R) can be calculated using Ohm's law when the off-state current and the drain voltage are obtained. Further, the off-state resistivity ρ can be calculated using the formula ρ=RA/L (where R is the off-state resistance), when the cross-sectional area A of the channel formation region and the channel length L are obtained. The off-state resistivity is preferably higher than or equal to $1\times10^9$ Ω·m (or higher than or equal to $1\times10^{10}$ Ω·m). The cross-section area A can be obtained in accordance with the formula A=dW where d is the thickness of the channel formation region and W is the channel width.

In addition, the energy gap of the oxide semiconductor film is 2 eV or more, preferably 2.5 eV or more, more preferably 3 eV or more.

Moreover, a transistor including a high-purity oxide semiconductor has favorable temperature characteristics. Specifically, in the temperature range of from –25° C. to 150° C., the current-voltage characteristics of the transistor, such as on-state current, off-state current, field-effect mobility, a sub-threshold value (an S value), and threshold voltage, hardly change. This means that the current-voltage characteristics are hardly deteriorated by the temperature.

Next, hot-carrier degradation of a transistor including an oxide semiconductor will be described.

The hot-carrier degradation refers to a phenomenon in which electrons that are accelerated to high speed become fixed charges by being injected into a gate insulating film from a channel in the vicinity of drain or form a trap level at the interface between the gate insulating film and the oxide semiconductor film, and thereby causing deterioration such as change in threshold voltage or gate leakage current. The causes of the hot-carrier degradation are channel-hot-electron injection (CHE injection) and drain-avalanche-hot-carrier injection (DAHC injection).

Since the band gap of silicon is as small as 1.12 eV, electrons are likely to be generated like an avalanche because of avalanche breakdown, and the number of electrons that are accelerated to high speed and go over a barrier to the gate insulating film is increased. In contrast, the oxide semiconductor described in this embodiment has a wide band gap of 3.15 eV; therefore, the avalanche breakdown is unlikely to occur and resistance to hot-carrier degradation is higher than that of silicon.

Note that the band gap of silicon carbide, which is one of the materials having a high breakdown voltage, and the band gap of the oxide semiconductor are approximately the same. However, electrons are less likely to be accelerated in an oxide semiconductor because the mobility of an oxide semiconductor is smaller than that of silicon carbide by approximately two orders of magnitude. Further, since a barrier between an oxide semiconductor and an oxide film that is a gate insulating film is larger than a barrier between silicon carbide, gallium nitride, or silicon and the oxide film; therefore, in an oxide semiconductor, the number of electrons injected to the oxide film is extremely small. Because the number of electrons injected to the oxide film is extremely small, an oxide semiconductor has less hot carrier degradation and higher drain breakdown voltage than silicon carbide, gallium nitride, or silicon. Therefore, it is not necessary to intentionally form low-concentration impurity regions between an oxide semiconductor functioning as a channel and a source and drain electrodes; thus, the structure of the transistor can be significantly simplified and the number of manufacturing steps can be reduced.

From the above, a transistor including an oxide semiconductor has high drain breakdown voltage of, specifically, 100 V or more, preferably 500 V, more preferably 1 kV or more.

Next, a manufacturing process of the transistor 410 will be described with reference to FIGS. 4A to 4E.

First, an insulating layer 407 serving as a base film is formed over a substrate 400.

Although there is no particular limitation on a substrate that can be used as the substrate 400, the substrate needs to have heat resistance high enough to withstand at least heat treatment to be performed later. In the case where the temperature of the heat treatment to be performed later is high, a substrate having a strain point of 730° C. or higher is preferably used. Specific examples of the substrate 400 include a glass substrate, a crystalline glass substrate, a ceramic substrate, a quartz substrate, a sapphire substrate, and a plastic substrate. Further, specific examples of a material of the glass substrate include aluminosilicate glass, aluminoborosilicate glass, and barium borosilicate glass.

As the insulating layer 407, an oxide insulating layer such as a silicon oxide layer, a silicon oxynitride layer, an aluminum oxide layer, or an aluminum oxynitride layer is preferably used. The insulating layer 407 can be formed by a plasma CVD method, a sputtering method, or the like. In order to prevent the insulating layer 407 from including a large amount of hydrogen, the insulating layer 407 is preferably formed by a sputtering method. In this embodiment, a silicon oxide layer is formed as the insulating layer 407 by a sputtering method. Specifically, the substrate 400 is transferred to a process chamber and a sputtering gas including high-purity oxygen from which hydrogen and moisture are removed is introduced, and a target of silicon or silicon oxide is used, whereby a silicon oxide layer is formed as the insulating layer 407 over the substrate 400. Note that the substrate 400 may be kept at room temperature or may be heated during deposition.

A specific example of a deposition condition for a silicon oxide layer is as follows: quartz (preferably, synthetic quartz) is used as the target; the substrate temperature is 108° C.; the distance between a target and the substrate 400 (T-S distance) is 60 mm; the pressure is 0.4 Pa; the high-frequency power is 1.5 kW; the atmosphere is oxygen and argon (the oxygen flow rate 25 sccm: the argon flow rate 25 sccm=1:1); and an RF sputtering method is used. The thickness of the film is 100 nm. Note that a silicon target may be used as the target instead of the quartz (preferably, synthetic quartz) target. Further, an oxygen gas may be used as a sputtering gas instead of a mixed gas of oxygen and argon. Here, a sputtering gas for forming the insulating layer 407 is a high-purity gas in which impurities such as hydrogen, water, hydroxyl, or hydride are reduced to such a level that the concentration thereof can be expressed in ppm or ppb.

Further, it is preferable that the insulating layer 407 be formed while moisture remaining in the process chamber is removed so that the insulating layer 407 may be prevented from including hydrogen, hydroxyl, moisture, or the like.

In order to remove moisture remaining in the process chamber, an entrapment vacuum pump may be used. For example, a cryopump, an ion pump, or a titanium sublimation pump can be used. Further, as an evacuation means, a turbo pump is preferably used in combination with a cold trap. A process chamber which is evacuated with a cryopump is preferable because hydrogen atoms, compounds including a hydrogen atom such as water ($H_2O$), or the like are exhausted from the process chamber and thus hydrogen atoms are hardly included in the insulating layer 407 formed in the process chamber.

Examples of a sputtering method include an RF sputtering method in which a high-frequency power source is used for a sputtering power supply, a DC sputtering method, and a pulsed DC sputtering method in which a bias is applied in a pulsed manner. An RF sputtering method is mainly used in the case where an insulating film is formed, and a DC sputtering method is mainly used in the case where a metal film is formed.

In addition, there is also a multi-source sputtering apparatus in which a plurality of targets of different materials can be set. With the multi-source sputtering apparatus, films of different materials can be formed to be stacked in one chamber, or a film can be formed by electric discharge of plural kinds of materials at the same time in one chamber.

Further, a sputtering apparatus provided with a magnet system inside the chamber and used for a magnetron sputtering method, or a sputtering apparatus used for an ECR sputtering method in which plasma generated with the use of microwaves is used without using glow discharge can be used.

Further, as a deposition method using a sputtering method, there are also a reactive sputtering method in which a target substance and a sputtering gas component are chemically reacted with each other during the deposition to form a thin compound film thereof, and a bias sputtering method in which voltage is also applied to a substrate during the deposition.

The structure of the insulating layer 407 is not limited to a single-layer structure and may be a stacked-layer structure. For example, the insulating layer 407 may have a stacked-layer structure in which a nitride insulating layer such as a silicon nitride layer, a silicon nitride oxide layer, an aluminum nitride layer, or an aluminum nitride oxide layer and the above oxide insulating layer are stacked in this order over the substrate 400.

For example, a sputtering gas including high-purity nitrogen is introduced and a silicon nitride layer is formed using a silicon target, and then the sputtering gas is changed to a gas including high-purity oxygen and a silicon oxide layer is formed. In this case also, it is preferable that the silicon nitride layer or a silicon oxide layer be formed while moisture remaining in the process chamber is removed as in the above case. Further, the substrate may be heated during deposition.

Then, an oxide semiconductor film is formed over the insulating layer 407 by a sputtering method.

Further, in order that hydrogen, hydroxyl, and moisture be contained in the oxide semiconductor film as little as possible, it is preferable that the substrate 400 over which the insulating layer 407 is formed be preheated in a preheating chamber of a sputtering apparatus as pretreatment for the deposition so that impurities such as hydrogen and moisture adsorbed to the substrate 400 may be removed and evacuated. Note that an evacuation means in the preheating chamber is preferably a cryopump so as to evacuate hydrogen atoms, compounds containing hydrogen atoms like water ($H_2O$), and the like. Further, this preheating is preferably performed on the substrate 400 before the formation of the gate insulating film 402, which is formed later. Further, this preheating is preferably performed similarly on the substrate 400 over which components up to the first electrode 415a and the second electrode 415b are formed. Note that this preheating treatment may be omitted.

Note that before the oxide semiconductor film is formed by a sputtering method, dust attached to a surface of the insulating layer 407 is preferably removed by reverse sputtering in which an argon gas is introduced and plasma is generated. The reverse sputtering refers to a method in which an RF power source is used for application of voltage to a substrate in an argon atmosphere and plasma is generated in the vicinity of the substrate to modify the surface. Note that instead of an argon atmosphere, nitrogen, helium, oxygen, or the like may be used.

As a target for forming the oxide semiconductor film, a metal oxide target including zinc oxide as its main component can be used. As the target, a target having a composition ratio in which $In_2O_3$:$Ga_2O_3$:$ZnO$=1:1:1 (molar ratio) a target having a composition ratio in which $In_2O_3$:$Ga_2O_3$:$ZnO$=1:1:2 (molar ratio), or a target having a composition ratio in which $In_2O_3$:$Ga_2O_3$:$ZnO$=1:1:4 (molar ratio) can be used. The filling factor of the target including In, Ga, and Zn is 90% or higher and 100% or lower, and preferably 95% or higher and lower than 100%. With the use of a target with high filling factor, the resulting oxide semiconductor film has high density.

Note that the oxide semiconductor film may be formed in a rare gas (typically, argon) atmosphere, an oxygen atmosphere, or a mixed atmosphere of a rare gas and oxygen. Here, a sputtering gas for forming the oxide semiconductor film is a high-purity gas in which impurities such as hydrogen, water, hydroxyl, or hydride are reduced to such a level that the concentration thereof can be expressed in ppm or ppb.

The oxide semiconductor film is formed over the substrate 400 in such a manner that the substrate is held in a process chamber under reduced pressure, a sputtering gas from which hydrogen and moisture are removed is introduced while moisture remaining in the process chamber is removed, and metal oxide is used as a target. In order to remove moisture remaining in the process chamber, an entrapment vacuum pump is preferably used. For example, a cryopump, an ion pump, or a titanium sublimation pump is preferably used. Further, as an evacuation means, a turbo pump provided with a cold trap may be used. In a deposition chamber which is evacuated with a cryopump, hydrogen atoms, compounds and the like including hydrogen atoms like water ($H_2O$) (and preferably, a compound including a carbon atom) are exhausted. Accordingly, the concentration of impurities in the oxide semiconductor film formed in this deposition chamber can be reduced. Further, the substrate temperature may be kept at room temperature or may be increased to a temperature lower than 400° C. during the deposition of the oxide semiconductor film.

As an example of the deposition condition of the oxide semiconductor film, the following condition can be given: the temperature of the substrate is room temperature; the distance between the substrate and the target is 110 mm; the pressure is 0.4 Pa; the direct current (DC) power supply is 0.5 kW; and the atmosphere is oxygen and argon (the oxygen flow rate 15 sccm: the argon flow rate 30 sccm=1:2). Note that a pulse direct current (DC) power supply is preferable because dust can be reduced and the film thickness can be uniform. The thickness of the oxide semiconductor film is preferably 2 nm or more and 200 nm or less, preferably 5 nm or more and 30 nm or less. Note that an appropriate thickness of the oxide semiconductor film is different depending on the material; therefore, the thickness may be determined as appropriate depending on the material.

Although an In—Ga—Zn—O-based oxide that is a three-component metal oxide is used as the oxide semiconductor in the above example, the following oxide semiconductors can also be used: In—Sn—Ga—Zn—O-based oxide that is a four-component metal oxide; In—Sn—Zn—O-based oxide, In—Al—Zn—O-based oxide, Sn—Ga—Zn—O-based oxide, Al—Ga—Zn—O-based oxide, or Sn—Al—Zn—O-based oxide that is a three-component metal oxide; In—Zn—O-based oxide, Sn—Zn—O-based oxide, Al—Zn—O-based oxide, Zn—Mg—O-based oxide, Sn—Mg—O-based oxide, or In—Mg—O-based oxide that is a two-component metal oxide; In—O-based oxide; Sn—O-based oxide; Zn—O-based oxide; and the like. An oxide semiconductor layer may include Si. The oxide semiconductor layer may be amorphous or crystalline. Further, the oxide semiconductor layer may be non-single-crystal or single crystal.

Note that in this specification, a three-component metal oxide refers to a substance including three kinds of metal elements in addition to oxygen (O). Similarly, a four-component metal oxide refers to a substance including four kinds of metal elements in addition to oxygen (O), and a two-component metal oxide refers to a substance including two kinds of metal elements in addition to oxygen (O).

Note that as the oxide semiconductor film, a thin film expressed by $InMO_3(ZnO)_m$ (m>0) can be used. Here, M represents one or more metal elements selected from Ga, Al, Mn, and Co. For example, M can be Ga, Ga and Al, Ga and Mn, or Ga and Co.

Figure 4A:
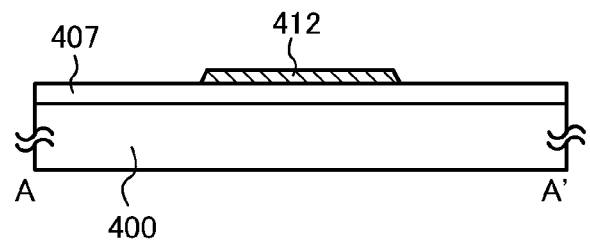
FIGS. 4A to 4E are cross-sectional views of a manufacturing process of a transistor in which a channel formation region is provided in an oxide semiconductor film.

Then, an oxide semiconductor film is processed into the island-shaped oxide semiconductor film 412 by a first photolithography step (see FIG. 4A). Note that a resist mask for forming the island-shaped oxide semiconductor film 412 may be formed using an ink jetting method. Formation of the resist mask by an ink jetting method does not need a photomask; thus, manufacturing cost can be reduced.

Note that the etching of the oxide semiconductor film may be dry etching, wet etching, or both wet etching and dry etching.

In the case of dry etching, a parallel plate reactive ion etching (RIE) method or an inductively coupled plasma (ICP) etching method can be used. In order to etch the film to form a desired shape, the etching conditions (the amount of electric power applied to a coil-shaped electrode, the amount of electric power applied to an electrode on a substrate side, the temperature of the electrode on the substrate side, or the like) are adjusted as appropriate.

As an etching gas for dry etching, a gas including chlorine (a chlorine-based gas such as chlorine ($Cl_2$), boron trichloride ($BCl_3$), silicon tetrachloride ($SiCl_4$), or carbon tetrachloride ($CCl_4$)) is preferable but a gas including fluorine (a fluorine-based gas such as carbon tetrafluoride ($CF_4$), sulfur hexafluoride ($SF_6$), nitrogen trifluoride ($NF_3$), or trifluoromethane ($CHF_3$)), hydrogen bromide (HBr), oxygen ($O_2$), any of these gases to which a rare gas such as helium (He) or argon (Ar) is added, or the like can be used.

As an etchant used for wet etching, for example, a solution obtained by mixing phosphoric acid, acetic acid, and nitric acid, and an ammonia peroxide mixture (31 wt % hydrogen peroxide water: 28 wt % ammonia water: water=5:2:2), or the like can be used. Further, ITO07N (produced by KANTO CHEMICAL CO., INC.) may be used. The etching conditions (e.g., an etchant, an etching period, and a temperature) may be adjusted as appropriate in accordance with a material of the oxide semiconductor.

In the case of wet etching, an etchant is removed together with the material which is etched off by cleaning. The waste liquid including the etchant and the material which is etched off may be purified and the material may be reused. When a material (e.g., a rare metal such as indium) included in the oxide semiconductor film is collected from the waste liquid after the etching and reused, the resources can be efficiently used.

In this embodiment, the oxide semiconductor film is processed into the island-shaped oxide semiconductor film 412 by a wet etching method using a mixed solution of phosphoric acid, acetic acid, and nitric acid as an etchant.

Then, first heat treatment is performed on the oxide semiconductor film 412. The temperature of the first heat treatment is 400° C. or higher and 750° C. or lower, preferably 400° C. or higher and lower than the strain point of the substrate. Here, the substrate is put in an electric furnace which is one type of heat treatment apparatus and heat treatment is performed on the oxide semiconductor film in a nitrogen atmosphere at 450° C. for one hour. After that, oxide semiconductor film is prevented from being exposed to air and so as not to include water or hydrogen. Thus, an oxide semiconductor film is obtained. By this first heat treatment, hydrogen, water, hydroxyl, and the like can be removed from the oxide semiconductor film 412.

Note that the heat treatment apparatus is not limited to an electric furnace, and an apparatus may be provided with a device for heating an object by heat conduction or thermal radiation from a heater such as a resistance heater. For example, a rapid thermal annealing (RTA) apparatus such as a gas rapid thermal annealing (GRTA) apparatus or a lamp rapid thermal annealing (LRTA) apparatus can be used. An LRTA apparatus is an apparatus for heating an object by radiation of light (an electromagnetic wave) emitted from a lamp such as a halogen lamp, a metal halide lamp, a xenon arc lamp, a carbon arc lamp, a high-pressure sodium lamp, or a high-pressure mercury lamp. A GRTA apparatus is an apparatus which performs heat treatment using a high-temperature gas. As the gas, an inert gas (typically, a rare gas such as argon) or a nitrogen gas can be used.

For example, the first heat treatment can employ GRTA, in which the substrate is transferred into an inert gas heated to a high temperature of 650° C. to 700° C., and heated for several minutes there, and then the substrate is transferred out of the inert gas heated to a high temperature. With GRTA, high-temperature heat treatment for a short period of time can be achieved.

In the first heat treatment, it is preferable that water, hydrogen, and the like be not contained in the atmosphere. In addition, a gas such as nitrogen, helium, neon, or argon which is introduced into a heat treatment apparatus preferably has a purity of 6N (99.9999%) or higher, more preferably 7N (99.99999%) or higher (that is, the concentration of impurities is 1 ppm or lower, preferably 0.1 ppm or lower).

Note that depending on the conditions of the first heat treatment or a material of the oxide semiconductor film, the oxide semiconductor film 412 may be crystallized to be microcrystal or polycrystal. For example, the oxide semiconductor film may crystallize to become a microcrystalline oxide semiconductor film having a crystallinity of 80% or more. Note that the island-shaped oxide semiconductor film 412 may be an amorphous oxide semiconductor film without crystallization after the first heat treatment. The oxide semiconductor film may become an oxide semiconductor film in which a microcrystalline portion (with a grain diameter of 1 nm or more and 20 nm or less, typically 2 nm or more and 4 nm or less) is mixed into an amorphous oxide semiconductor film.

The first heat treatment on the oxide semiconductor film may be performed on the oxide semiconductor film before being processed into the island-shaped oxide semiconductor film. In that case, after the first heat treatment, the substrate is taken out of the heat treatment apparatus and subjected to the first photolithography step. In addition, the first heat treatment can be performed either after the source electrode and the drain electrode are stacked over the oxide semiconductor film, or after the gate insulating layer is formed over the source electrode and the drain electrode.

Although the first heat treatment is performed mainly for the purpose of removing impurities such as hydrogen, water, and hydroxyl from the oxide semiconductor film, it may generate oxygen defects in the oxide semiconductor film. Therefore, the first heat treatment is preferably followed by treatment for supplying oxygen. Specifically, heat treatment in an oxygen atmosphere or an atmosphere including nitrogen and oxygen (e.g., nitrogen to oxygen is 4 to 1 in volume ratio) may be performed after the first heat treatment, for example. Further, plasma treatment in an oxygen atmosphere may be employed.

The first heat treatment has an effect of dehydration or dehydrogenation on the oxide semiconductor film.

Then, a conductive film is formed over the insulating layer 407 and the oxide semiconductor film 412. The conductive film may be formed by a sputtering method or a vacuum evaporation method. As a material of the conductive film, a metal material such as Al, Cu, Cr, Ta, Ti, Mo, W, or Y, an alloy material including any of the metal materials, a conductive metal oxide, and the like can be given. Further, in order to prevent hillocks or whiskers, an Al material to which an element such as Si, Ti, Ta, W, Mo, Cr, Nd, Sc, or Y, or the like is added may be used. In this case, heat resistance can be improved. The conductive metal oxide can be indium oxide ($In_2O_3$), tin oxide ($SnO_2$), zinc oxide (ZnO), an indium oxide-tin oxide alloy ($In_2O_3$—$SnO_2$, abbreviated as ITO), an indium oxide-zinc oxide alloy ($In_2O_3$—ZnO), or any of these metal oxide materials including silicon or silicon oxide.

Further, the conductive film may have a single-layer structure or a stacked-layer structure of two or more layers. For example, a single-layer structure of an aluminum film including silicon; a two-layer structure of an aluminum film and a titanium film stacked thereover; and a three-layer structure of a Ti film, an aluminum film stacked thereover, and a Ti film stacked thereover can be given. Further, a stacked-layer structure in which a metal layer of Al, Cu, or the like and a refractory metal layer of Cr, Ta, Ti, Mo, W, or the like are stacked may be employed. In this embodiment, as the conductive film, a 150-nm-thick titanium film is formed by sputtering.

Figure 4B:
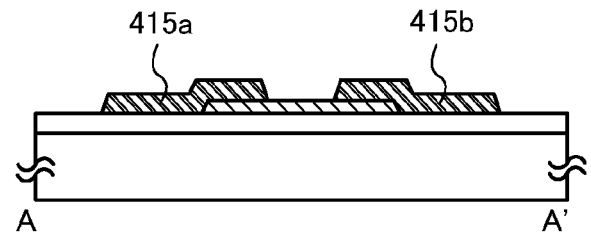

Then, a resist mask is formed over the conductive film by a second photolithography step and selective etching is performed, whereby the first electrode 415a and the second electrode 415b are formed, and then, the resist mask is removed (see FIG. 4B). The first electrode 415a serves as one of a source electrode and a drain electrode while the second electrode 415b serves as the other of the source electrode and the drain electrode. Here, the first electrode 415a and the second electrode 415b are preferably etched so as to have tapered ends because coverage with the gate insulating film formed thereon will be improved. Note that resist mask for forming the first electrode 415a and the second electrode 415b may be formed by an ink jetting method. Formation of the resist mask by an ink jetting method does not needs a photomask; thus, manufacturing cost can be reduced.

Note that in the etching of the conductive film, in order to prevent the oxide semiconductor film 412 from being removed and the insulating layer 407 thereunder from being exposed, their materials and etching conditions of the conductive film need to be adjusted as appropriate. Therefore, in this embodiment, an In—Ga—Zn—O-based oxide semiconductor is used as the oxide semiconductor film 412, a titanium film is used as the conductive film, and an ammonium hydrogen peroxide mixture (a mixture of ammonia, water, and a hydrogen peroxide solution) is used as an etchant so that part of the oxide semiconductor film 412 is not etched. However, the present invention is not limited thereto. In other words, part of the oxide semiconductor film 412 may be etched by the second photolithography step to form an oxide semiconductor film having a groove (a depression portion).

Ultraviolet, KrF laser light, or ArF laser light is used for light exposure for forming the resist mask in the second photolithography step. A channel length L of the transistor to be formed later depends on the width of an interval between a lower end of the first electrode 415a and a lower end of the second electrode 415b which are adjacent to each other over the oxide semiconductor film 412. Note that when light exposure is performed to provide the channel length L of less than 25 nm, the light exposure for the formation of the resist mask in the second photolithography step is performed using extreme ultraviolet light having an extremely short wavelength of several nanometers to several tens of nanometers. In the light exposure by extreme ultraviolet light, the resolution is high and the focus depth is large. Accordingly, the channel length L of the transistor to be formed later can be 10 nm or more and 1000 nm or less. In this case, an increase in operation speed of the transistor can be achieved, and further, a reduction in power consumption of the transistor can be achieved due to extremely small off-state current.

Figure 4C:
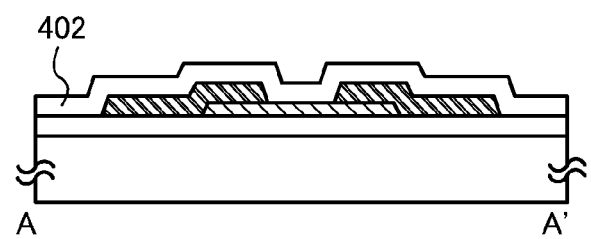

Then, the gate insulating film 402 is formed over the insulating layer 407, the oxide semiconductor film 412, the first electrode 415a, and the second electrode 415b (see FIG. 4C).

The gate insulating film 402 can be formed to have a single-layer structure or a stacked-layer structure including any of a silicon oxide layer, a silicon nitride layer, a silicon oxynitride layer, a silicon nitride oxide layer, and an aluminum oxide layer by a plasma CVD method, a sputtering method, or the like.

The gate insulating film 402 is preferably formed in a manner such that hydrogen is not included in the gate insulating film 402. Thus, the gate insulating film 402 is preferably formed by a sputtering method, in which hydrogen in an atmosphere used for the deposition can be reduced to a very low level. In the case of forming a silicon oxide film by a sputtering method, a silicon target or a quartz target is used as a target, and oxygen or a mixed gas of oxygen and argon is used as a sputtering gas.

The gate insulating film 402 can have a structure in which a silicon oxide layer and a silicon nitride layer are stacked in this order over the substrate 400. For example, a silicon oxide layer ($SiO_x$ (x>0)) with a thickness of 5 nm or more and 300 nm or less may be formed as a first gate insulating film and a silicon nitride layer ($SiN_y$ (y>0)) with a thickness of 50 nm or more and 200 nm or less may be formed as a second gate insulating film over the first gate insulating film to provide a gate insulating film with a thickness of 100 nm. In this embodiment, a silicon oxide layer with a thickness of 100 nm is formed by an RF sputtering method under a pressure of 0.4 Pa, a high-frequency power of 1.5 kW, and an atmosphere of oxygen and argon (the oxygen flow rate 25 sccm: the argon flow rate 25 sccm=1:1).

Figure 4D:
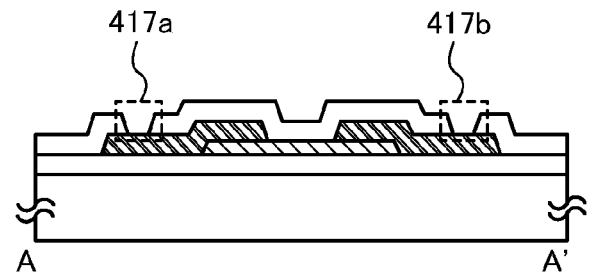

Next, by a third photolithography step, a resist mask is formed, and selective etching is performed, whereby part of the gate insulating film 402 is removed; thus, openings 417a and 417b reaching the first electrode 415a and the second electrode 415b are formed (see FIG. 4D). Formation of the resist mask by an ink jetting method does not needs a photomask; thus, manufacturing cost can be reduced.

Figure 4E:
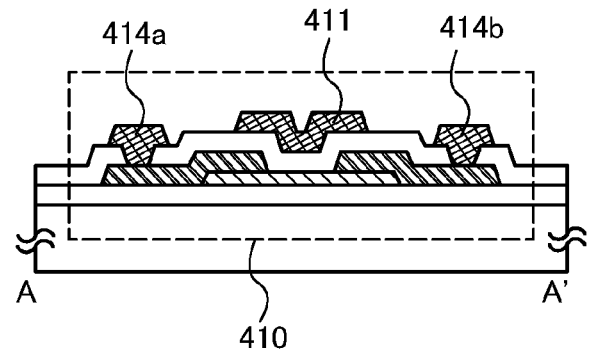

Then, after a conductive film is formed over the gate insulating film 402 and in the openings 417a and 417b, the gate electrode 411, the first wiring 414a and the second wiring 414b are formed in a fourth photolithography step (see FIG. 4E).

The gate electrode 411, the first wiring 414a, and the second wiring 414b can be formed to have a single-layer structure or a stacked-layer structure using a metal material such as molybdenum, titanium, chromium, tantalum, tungsten, aluminum, copper, neodymium, or scandium, or an alloy material containing any of these materials as the main component. Specific examples of a two-layer structure of the gate electrode 411, the first wiring 414a, and the second wiring 414b include a structure including an aluminum layer and a molybdenum layer thereover, a structure including a copper layer and a molybdenum layer thereover, a structure including a copper layer and a titanium nitride layer or a tantalum nitride layer thereover, and a structure including a titanium nitride layer and a molybdenum layer thereover. Specific examples of a three-layer structure include a structure in which a tungsten layer or a tungsten nitride layer, an alloy layer of aluminum and silicon or aluminum and titanium, and a titanium nitride layer or a titanium layer are stacked. Note that the gate electrode can be formed using a light-transmitting conductive film. A specific example of the light-transmitting conductive film, a light-transmitting conductive oxide can be given.

In this embodiment, as the gate electrode 411, the first wiring 414a, and the second wiring 414b, a 150-nm-thick titanium film formed by a sputtering method is used.

Then, second heat treatment (preferably, at 200° C. or higher and 400° C. or lower, for example, at 250° C. or higher and 350° C. or lower) is performed in an inert gas atmosphere or in an oxygen gas atmosphere. In this embodiment, the second heat treatment is performed in a nitrogen atmosphere at 250° C. for one hour. Note that the second heat treatment may be performed after a protective insulating layer or a planarization insulating layer is formed over the transistor 410.

Heat treatment may be further performed at 100° C. or higher and 200° C. or lower in air for 1 hour or more and 30 hours or less. This heat treatment may be performed at a fixed heating temperature or the temperature may be increased from room temperature to a heating temperature of 100° C. or higher and 200° C. or lower and decreased from the heating temperature to room temperature, plural times repeatedly.

Through the above process, the transistor 410 including the high-purity oxide semiconductor film 412 in which the concentration of hydrogen, moisture, hydride, and hydroxide is reduced can be formed.

The transistor 410 in this embodiment can be used as the transistor 111 and a transistor in each of the comparator 151, the digital arithmetic process circuit 152, and the pulse width modulation output driver 153 in Embodiment 1.

A protective insulating layer or a planarization insulating layer for planarization may be provided over the transistor 410. The protective insulating layer can be formed to have a single-layer structure or a stacked-layer structure including any of a silicon oxide layer, a silicon nitride layer, a silicon oxynitride layer, a silicon nitride oxide layer, and an aluminum oxide layer. The planarization insulating layer can be formed of a heat-resistant organic material, such as polyimide, acrylic, benzocyclobutene, polyamide, or epoxy. As an alternative to such organic materials, it is also possible to use a low-dielectric constant material (a low-k material), a siloxane-based resin, phosphosilicate glass (PSG), borophosphosilicate glass (BPSG), or the like. The planarization insulating layer may be formed by stacking a plurality of insulating films formed of any of these materials.

Here, a siloxane-based resin corresponds to a resin including a Si—O—Si bond which is formed using a siloxane-based material as a starting material. The siloxane-based resin may include an organic group (e.g., an alkyl group or an aryl group) or a fluoro group as a substituent. The organic group may include a fluoro group.

The method for forming the planarization insulating layer is not particularly limited. Depending on the material, the planarization insulating layer can be formed by a method such as sputtering method, an SOG method, a spin coating method, a dipping method, a spray coating method, or a droplet discharge method (e.g., an ink jetting method, screen printing, or offset printing), or by using a tool (an apparatus) such as a doctor knife, a roll coater, a curtain coater, or a knife coater.

As described above, by removing moisture remaining in the reaction atmosphere in the formation of the oxide semiconductor film, the concentration of hydrogen and hydride in the oxide semiconductor film can be reduced.

Figure 5A:
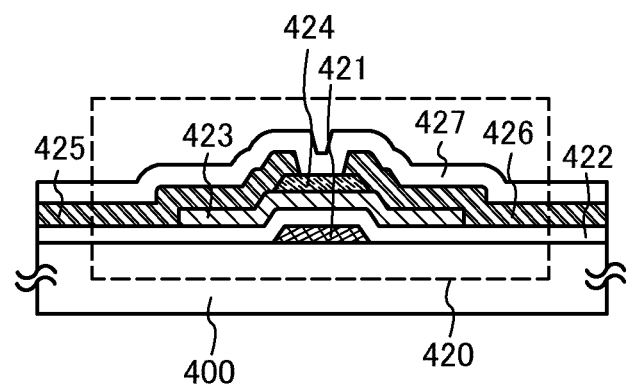
FIGS. 5A to 5C are cross-sectional views of transistors in which a channel formation region is provided in an oxide semiconductor film.
Figure 5B:
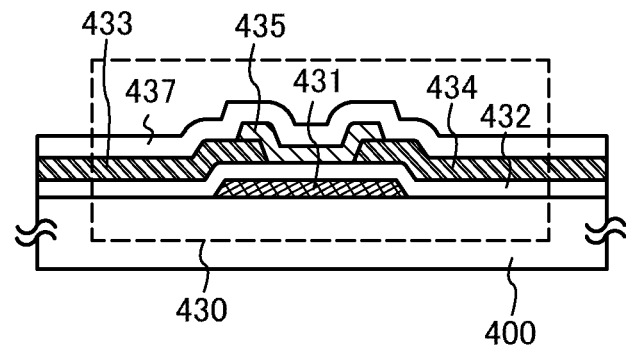
Figure 5C:
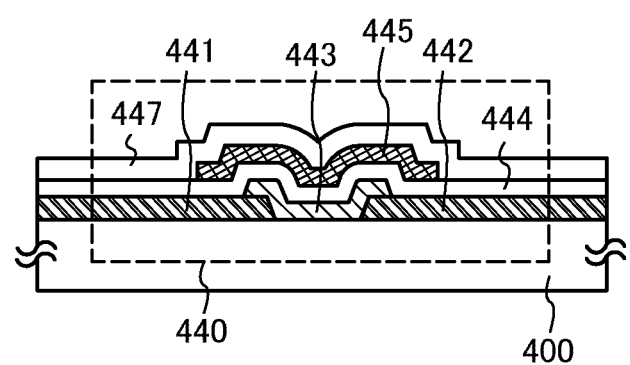

FIGS. 5A to 5C illustrate other examples of a structure of a transistor including high-purity oxide semiconductor which is different from the transistor in FIG. 3B.

A transistor 420 in FIG. 5A is a bottom-gate transistor. The transistor 420 includes a gate electrode 421 over the substrate 400, a gate insulating film 422 over the gate electrode 421, an oxide semiconductor film 423 which is over the gate insulating film 422 and overlaps with the gate electrode 421, a channel protective film 424 which is over the oxide semiconductor film 423 and overlaps with the gate electrode 421, and a conductive film 425 and a conductive film 426 over the oxide semiconductor film 423. The transistor 420 may include the insulating film 427 over the oxide semiconductor film 423, as its component. In the transistor 420, the conductive film 425 and the conductive film 426, which are the source electrode and the drain electrode, are in contact with a top surface of the oxide semiconductor film 423 including a channel formation region; therefore, the transistor 420 can be referred to as a top-contact transistor.

The channel protective film 424 is provided to prevent damage (for example, film thickness reduction due to plasma or an etchant in etching) of a portion of the oxide semiconductor film 423 which serves as a channel formation region, in a later step. This can improve the reliability of the transistor.

The channel protective film 424 can be formed using an inorganic material containing oxygen (e.g., silicon oxide, silicon nitride oxide, silicon oxynitride, aluminum oxide, or aluminum oxynitride). The channel protective film 424 can be formed by a vapor deposition method such as a plasma CVD method or a thermal CVD method, or a sputtering method. After the channel protective film 424 is formed, the shape thereof is processed by etching. Here, the channel protective film 424 is formed in such a manner that a silicon oxide film is formed by a sputtering method and processed by etching using a mask formed by photolithography.

In addition, when the channel protective film 424 is formed in contact with the island-shaped oxide semiconductor film 423, a region in the island-shaped oxide semiconductor film 423 which is in contact with the channel protective film 424 is increased in resistance and thereby becomes a high-resistance oxide semiconductor region. By forming the channel protective film 424, the oxide semiconductor film 423 can have the high-resistance oxide semiconductor region in the vicinity of the interface with the channel protective film 424.

Note that the transistor 420 may further include a back gate electrode over the insulating film 427. The back gate electrode is formed to overlap with a channel formation region in the oxide semiconductor film 423. The back gate electrode may be electrically insulated and in a floating state, or may be in a state where the back gate electrode is supplied with a potential. In the latter case, the back gate electrode may be supplied with a potential at the same level as the gate electrode 421, or may be supplied with a fixed potential such as a ground potential. By controlling the level of the potential supplied to the back gate electrode, it is possible to control the threshold voltage of the transistor 420.

A transistor 430 in FIG. 5B is a bottom-gate transistor. The transistor 430 includes a gate electrode 431 over the substrate 400, a gate insulating film 432 over the gate electrode 431, a conductive film 433 and a conductive film 434 over the gate insulating film 432, and an oxide semiconductor film 435 over the gate electrode 431. The transistor 430 may include an insulating film 437 over the oxide semiconductor film 435, as its component. In the transistor 430, the conductive film 433 and the conductive film 434, which are the source electrode and the drain electrode, are in contact with a bottom surface of the oxide semiconductor film 435 including a channel formation region; therefore, the transistor can be referred to as a bottom-contact transistor.

In addition, in the case of the bottom-contact transistor 430, the thickness of the conductive film 433 and the conductive film 434 is preferably small in order to prevent a break of the oxide semiconductor film 435 formed later. Specifically, the thickness of the conductive film 433 and the conductive film 434 are 10 nm to 200 nm, preferably 50 nm to 75 nm.

Note that the transistor 430 may further include a back gate electrode over the insulating film 437. The back gate electrode is formed to overlap with a channel formation region in the oxide semiconductor film 435. The back gate electrode may be electrically insulated and in a floating state, or may be in a state where the back gate electrode is supplied with a potential. In the latter case, the back gate electrode may be supplied with a potential at the same level as the gate electrode 431, or may be supplied with a fixed potential such as a ground potential. By controlling the level of the potential supplied to the back gate electrode, it is possible to control the threshold voltage of the transistor 430.

A transistor 440 in FIG. 5C is a top-gate transistor. The transistor 440 includes a conductive film 441 and a conductive film 442 over the substrate 400, an oxide semiconductor film 443 over the conductive film 441 and the conductive film 442, a gate insulating film 444 over the oxide semiconductor film 443, and a gate electrode 445 which is over the gate insulating film 444 and overlaps with the oxide semiconductor film 443. The transistor 440 may include an insulating film 447 over the gate electrode 445, as its component. In the transistor 440, the conductive film 441 and the conductive film 442 which are the source electrode and the drain electrode are in contact with a bottom surface of the oxide semiconductor film 443 including a channel formation region; therefore, the transistor can be referred to as a bottom-contact transistor.

In addition, in the case of the top-gate transistor 440, the thickness of the conductive film 441 and the conductive film 442 is preferably small in order to prevent a break of the oxide semiconductor film 443 formed later. Specifically, the thickness of the conductive film 441 and the conductive film 442 are 10 nm to 200 nm, preferably 50 nm to 75 nm.

In this embodiment, the transistor 410, the transistor 420, the transistor 430, and the transistor 440 are n-channel transistors. As described in Embodiment 1, since a digital circuit outputs only either 1 or 0 (zero), transistors in the digital circuit can all be n-channel transistors which are described in this embodiment.

In particular, since the output voltage of the voltage converter circuit 102 is high, a transistor with high breakdown voltage is preferably used as the transistor 111. As a transistor with high breakdown voltage, a transistor which includes a channel formation region in an oxide semiconductor film which has a larger energy gap than a silicon semiconductor is suitable.

In the power source circuit including the transistor in this embodiment, by using a digital control circuit in the power source circuit, degradation of circuit operation of the power source circuit can be reduced even when characteristics of transistors vary.

In the power source circuit including the transistor in this embodiment, by using a digital control circuit in the power source circuit, the area of the power source circuit can be reduced.

In the power source circuit including the transistor in this embodiment, by reducing the area of the power source circuit, the cost of the power source circuit can be reduced.

This application is based on Japanese Patent Application serial no. 2010-095197 filed with Japan Patent Office on Apr. 16, 2010, the entire contents of which are hereby incorporated by reference.

Explanation of reference

101: power source circuit, 102: voltage converter circuit, 103: control circuit, 111: transistor, 112: coil, 113: diode, 114: capacitor, 121: triangle wave generator circuit, 123: pulse width modulation output driver, 124: resistor, 125: resistor, 127: arrow, 150: circuit, 151: comparator, 152: digital arithmetic process circuit, 152a: digital average—integrator 152a_1: digital: averaging circuit, 152a_2: digital integrator, 152b: digital pulse width modulator, 153: pulse width modulation output driver, 154: low pass filter, 155: clock divider, 201: adder circuit, 202: adder—subtractor circuit, 203: count comparison circuit, 204: latch circuit, 211: AND gate, 212: AND gate, 213: XOR gate, 214: flip flop, 221: AND gate, 222: AND gate, 224: OR gate, 225: XOR gate, 226: XOR gate, 227: flip flop, 241: flip flop, 242: flip flop, 243: NOR gate, 244: NOR gate, 251: adder, 252: adder, 253: adder, 254: adder, 255: adder, 256: adder, 257: adder, 258: adder, 259: adder, 261: inverter, 262: inverter, 263: NOR gate, 271: XOR gate, 272: XOR gate, 273: XOR gate, 274: XOR gate, 275: XOR gate, 276: XOR gate, 277: NAND gate, 278: AND gate, 279: OR gate, 281: NAND gate, 282: NAND gate, 400: substrate, 402: gate insulating film, 407: insulating layer, 410: transistor, 411: gate electrode, 412: oxide semiconductor film, 414*a*: wiring, 414*b*: wiring, 415*a*: electrode, 415*b*: electrode, 417*a*: opening, 417*b*: opening, 420: transistor, 421: gate electrode, 422: gate insulating film, 423: oxide semiconductor film, 424: channel protective film, 425: conductive film, 426: conductive film, 427: insulating film, 430: transistor, 431: gate electrode, 432: gate insulating film, 433: conductive film, 434: conductive film, 435: oxide semiconductor film, 437: insulating film, 440: transistor, 441: conductive film, 442: conductive film, 443: oxide semiconductor film, 444: gate insulating film, 445: gate electrode, 447: insulating film, CNT_RST: control reset signal, ONTO: signal, CNT1: signal, CNT2: signal, CNT3: signal, CNT4: signal, CNT5: signal, COMP: signal, RST: reset signal, CLK: clock signal, CIN: input signal, COUT: output signal, LIMIT: limit signal, DIG_AVE: averaged digital signal, CONT: control signal, SET-CNTO: signal, SET-CNT1: signal, SET-CNT2: signal, SET-CNT3: signal, SET-CNT4: signal, SET-CNT5: signal, PWM: pulse width modulation output signal, HIGH-SET: signal, LOW-SET: signal, pulse: signal.

The invention claimed is:

1. A power source circuit comprising:
   a comparator configured to compare a first voltage and a second voltage;
   a digital arithmetic process circuit configured to average, integrate, and digital pulse width modulate a digital signal output from the comparator;
   a pulse width modulation output driver configured to amplify the digital signal output from the digital arithmetic process circuit;
   a smoothing circuit configured to smooth the digital signal output from the pulse width modulation output driver; and
   a DC-DC converter,
   wherein the DC-DC converter comprises a coil, a diode, and a transistor comprising an oxide semiconductor film,
   wherein a first wiring is electrically connected to the source electrode of the transistor,
   wherein a second wiring is electrically connected to the drain electrode of the transistor,
   wherein the gate electrode of the transistor is a same layer as the first wiring and the second wiring,
   wherein the oxide semiconductor film comprises a channel formation region, and
   wherein the oxide semiconductor film contains indium and zinc.

2. The power source circuit according to claim 1, wherein the transistor further comprises:
   a source electrode and a drain electrode over the oxide semiconductor film; and
   a gate electrode over the oxide semiconductor film, the source electrode and the drain electrode.

3. The power source circuit according to claim 1, wherein the transistor further comprises:
   a source electrode and a drain electrode under the oxide semiconductor film; and
   a gate electrode over the oxide semiconductor film, the source electrode and the drain electrode.

4. The power source circuit according to claim 1, wherein the transistor further comprises:
   a source electrode and a drain electrode over the oxide semiconductor film; and
   a gate electrode under the oxide semiconductor film, the source electrode and the drain electrode.

5. The power source circuit according to claim 1, wherein the transistor further comprises:
   a source electrode and a drain electrode under the oxide semiconductor film; and
   a gate electrode under the oxide semiconductor film, the source electrode and the drain electrode.

6. The power source circuit according to claim 1, wherein the smoothing circuit is a low pass filter.

7. A power source circuit comprising:
   a comparator configured to compare a first voltage and a second voltage;
   a digital arithmetic process circuit configured to average, integrate, and digital pulse width modulate a digital signal output from the comparator;
   a pulse width modulation output driver configured to amplify the digital signal output from the digital arithmetic process circuit; and
   a smoothing circuit configured to smooth the digital signal output from the pulse width modulation output driver,
   wherein the comparator, the digital arithmetic process circuit, and the pulse width modulation output driver each comprise a transistor comprising an oxide semiconductor film, a source electrode, a drain electrode, a gate electrode, and a gate insulating film,
   wherein a first wiring is electrically connected to the source electrode,
   wherein a second wiring is electrically connected to the drain electrode,
   wherein the gate electrode is a same layer as the first wiring and the second wiring,
   wherein the oxide semiconductor film comprises a channel formation region, and
   wherein the oxide semiconductor film contains indium and zinc.

8. The power source circuit according to claim 7, wherein the source electrode and the drain electrode are provided over the oxide semiconductor film, and
   wherein the gate electrode is provided over the oxide semiconductor film, the source electrode and the drain electrode.

9. The power source circuit according to claim 7, wherein the source electrode and the drain electrode are provided under the oxide semiconductor film, and
   wherein the gate electrode is provided over the oxide semiconductor film, the source electrode and the drain electrode.

10. The power source circuit according to claim 7, wherein the source electrode and the drain electrode are provided over the oxide semiconductor film, and
    wherein the gate electrode is provided under the oxide semiconductor film, the source electrode and the drain electrode.

11. The power source circuit according to claim 7,
wherein the source electrode and the drain electrode are provided under the oxide semiconductor film, and
wherein the gate electrode is provided under the oxide semiconductor film, the source electrode and the drain electrode.

12. A power source circuit comprising:
a comparator configured to compare a first voltage and a second voltage;
an adder circuit configured to average a digital signal output from the comparator;
an adder-subtractor circuit configured to integrate the digital signal;
a count comparison circuit;
a latch circuit;
a pulse width modulation output driver configured to amplify the digital signal output from the latch circuit;
a smoothing circuit configured to smooth the digital signal output from the pulse width modulation output driver; and
a DC-DC converter,
wherein the count comparison circuit and the latch circuit are configured to digital pulse width modulate the digital signal output from the adder-subtractor circuit,
wherein the DC-DC converter comprises a coil, a diode, and a transistor comprising an oxide semiconductor film,
wherein a first wiring is electrically connected to the source electrode of the transistor,
wherein a second wiring is electrically connected to the drain electrode of the transistor,
wherein the gate electrode of the transistor is a same layer as the first wiring and the second wiring,
wherein the oxide semiconductor film comprises a channel formation region, and
wherein the oxide semiconductor film contains indium and zinc.

13. The power source circuit according to claim 12, wherein the transistor further comprises:
a source electrode and a drain electrode over the oxide semiconductor film; and
a gate electrode over the oxide semiconductor film, the source electrode and the drain electrode.

14. The power source circuit according to claim 12, wherein the transistor further comprises:
a source electrode and a drain electrode under the oxide semiconductor film; and
a gate electrode over the oxide semiconductor film, the source electrode and the drain electrode.

15. The power source circuit according to claim 12, wherein the transistor further comprises:
a source electrode and a drain electrode over the oxide semiconductor film; and
a gate electrode under the oxide semiconductor film, the source electrode and the drain electrode.

16. The power source circuit according to claim 12, wherein the transistor further comprises:
a source electrode and a drain electrode under the oxide semiconductor film; and
a gate electrode under the oxide semiconductor film, the source electrode and the drain electrode.

17. The power source circuit according to claim 12,
wherein the smoothing circuit is a low pass filter.

18. A power source circuit comprising:
a comparator configured to compare a first voltage and a second voltage;
an adder circuit configured to average a digital signal output from the comparator;
an adder-subtractor circuit configured to integrate the digital signal;
a count comparison circuit;
a latch circuit;
a pulse width modulation output driver configured to amplify the digital signal output from the latch circuit; and
a smoothing circuit configured to smooth the digital signal output from the pulse width modulation output driver,
wherein the count comparison circuit and the latch circuit are configured to digital pulse width modulate the digital signal output from the adder-subtractor circuit,
wherein the comparator, the adder circuit, the adder-subtractor circuit, the count comparison circuit, the latch circuit, and the pulse width modulation output driver each comprise a transistor comprising an oxide semiconductor film, a source electrode, a drain electrode, a gate electrode, and a gate insulating film,
wherein a first wiring is electrically connected to the source electrode,
wherein a second wiring is electrically connected to the drain electrode,
wherein the gate electrode is a same layer as the first wiring and the second wiring,
wherein the oxide semiconductor film comprises a channel formation region, and
wherein the oxide semiconductor film contains indium and zinc.

19. The power source circuit according to claim 18,
wherein the source electrode and the drain electrode are provided over the oxide semiconductor film, and
wherein the gate electrode is provided over the oxide semiconductor film, the source electrode and the drain electrode.

20. The power source circuit according to claim 18,
wherein the source electrode and the drain electrode are provided over the oxide semiconductor film, and
wherein the gate electrode is provided under the oxide semiconductor film, the source electrode and the drain electrode.

21. The power source circuit according to claim 18,
wherein the source electrode and the drain electrode are provided under the oxide semiconductor film, and
wherein the gate electrode is provided over the oxide semiconductor film, the source electrode and the drain electrode.

22. The power source circuit according to claim 18,
wherein the source electrode and the drain electrode are provided under the oxide semiconductor film, and
wherein the gate electrode is provided under the oxide semiconductor film, the source electrode and the drain electrode.

* * * * *